US008611312B2

(12) United States Patent
Sugaya

(10) Patent No.: US 8,611,312 B2
(45) Date of Patent: Dec. 17, 2013

(54) WIRELESS COMMUNICATION SYSTEM, WIRELESS COMMUNICATION DEVICE, PROGRAM AND WIRELESS COMMUNICATION METHOD

(75) Inventor: Shigeru Sugaya, Kanagawa (JP)

(73) Assignee: Sony Corporation, Tokyo (JP)

( * ) Notice: Subject to any disclaimer, the term of this patent is extended or adjusted under 35 U.S.C. 154(b) by 1327 days.

(21) Appl. No.: 12/135,183

(22) Filed: Jun. 8, 2008

(65) Prior Publication Data
US 2009/0003289 A1   Jan. 1, 2009

(30) Foreign Application Priority Data
Jun. 7, 2007 (JP) .................. P2007-151455

(51) Int. Cl.
*H04J 3/00* (2006.01)
*H04W 4/00* (2009.01)

(52) U.S. Cl.
USPC .......................................... 370/336; 370/329

(58) Field of Classification Search
USPC ........................................................ 370/336
See application file for complete search history.

(56) References Cited

U.S. PATENT DOCUMENTS
6,996,082 B2 * 2/2006 Terry et al. .................. 370/335

FOREIGN PATENT DOCUMENTS
JP        2005-198008         7/2005

* cited by examiner

*Primary Examiner* — Afshawn Towfighi
(74) *Attorney, Agent, or Firm* — Finnegan, Henderson, Farabow, Garrett & Dunner, L.L.P.

(57) ABSTRACT

A wireless communication device that performs wireless communication with another wireless communication device using a set time band set in advance from among time bands included in a frame with a predetermined cycle. The wireless communication device includes: a selector, that, when a set time band is changed, selects a new time band for after the change from the time bands included in the frame; a communication portion that transmits in a block information showing the new time band to the other wireless communication device as a set time band change request; and a setting portion that, based on the response received from the other wireless communication device with regard to the set time band change request, changes the setting of the set time band to the new time band.

12 Claims, 19 Drawing Sheets

FIG.5

| ELEMENT IDENTIFIER | INFORMATION LENGTH | RESERVATION CONTROL INFORMATION | RESERVATION DESTINATION DEVICE ADDRESS | RESERVATION SLOT ALLOCATION (1) | ... | RESERVATION SLOT ALLOCATION (N) |
|---|---|---|---|---|---|---|
| 711 | 712 | 713 | 714 | 715 | | 716 |

SLOT RESERVATION INFORMATION ELEMENT

FIG.6

| RESERVATION CONTROL INFORMATION | | | | | | |
|---|---|---|---|---|---|---|
| RESERVATION TYPE | RESERVATION NUMBER | REASON CODE | RESERVATION STATUS | OWNER IDENTIFICATION | CONFLICT CONTROL | SAFE RESERVATION |
| 801 | 802 | 803 | 804 | 805 | 806 | 807 |

FIG.7

| | | REASON CODE |
|---|---|---|
| 0 | APPROVAL | APPROVE RESERVATION REQUEST |
| 1 | CONFLICT | CONFLICT BETWEEN RESERVATION REQUEST AND EXISTING REQUEST |
| 2 | HOLD | HOLD RESERVATION REQUEST |
| 3 | INVALID | REFUSE RESERVATION REQUEST OR EXISTING RESERVATION |
| 4 | CORRECTION | REDUCE OR CONCANTENATE NUMBER OF RESERVATION SLOTS |
| 5 | ADDITIONAL | ADD RESERVATION SLOTS |
| 6 | CHANGE | CHANGE RESERVATION SLOTS |
| 7 | RESERVATION | RESERVE FOR FUTURE EXPANSION |

WIRELESS COMMUNICATION SYSTEM, WIRELESS COMMUNICATION DEVICE, PROGRAM AND WIRELESS COMMUNICATION METHOD

CROSS REFERENCES TO RELATED APPLICATION(S)

The present invention contains subject matter related to Japanese Patent Application JP 2007-151455 filed in the Japan Patent Office on Jun. 7, 2007, the entire contents of which being incorporated herein by reference.

BACKGROUND OF THE INVENTION

1. Field of the Invention

The present invention relates to a wireless communication system, a wireless communication device, a program and a wireless communication method.

2. Description of the Related Art

The WiMedia Distributed MAC standard describes wireless communication devices that form an ad hoc network (hereinafter referred to as a "wireless communication system") with peripheral wireless communication devices and perform wireless communication, and also describes wireless communication methods. With the technology described by the WiMedia Distributed MAC standard, each wireless communication device transmits beacons using a beacon period established at the head of a set super frame at a predetermined time interval (e.g. 65536 µs) to operate the wireless communication system.

The above-mentioned beacon period is provided with a plurality of beacon slots, and each wireless communication device transmits beacons using a different beacon slot. For that reason, when a wireless communication device receives a beacon in one of the beacon period beacon slots, the wireless communication device can immediately ascertain the presence of other peripheral wireless communication devices.

An example of a wireless communication device is disclosed, for example, in the WiMedia Distributed MAC standard, and in Japanese Patent Application Publication No. JP-A-2005-198008. Each wireless communication device forming part of a wireless communication system sets a time slot (time band) included in the above-mentioned super frame and uses the set time band to perform wireless communication.

SUMMARY OF THE INVENTION

However, known wireless communication devices require a significant amount of time when changing a set time band. For example, when a known wireless communication device attempts to add a time band to a set time band, it must first perform a negotiation process with a correspondent wireless communication device with regard to the time band it wishes to add. After that, the known wireless communication device must coalesce the existing set time band and the time band it wishes to add, a process that may require a significant amount of time.

To address this, the present invention provides a new and improved wireless communication system, wireless communication device, program and wireless communication method that can reduce the time required to change the time band.

According to an embodiment of the present invention, there is provided a wireless communication system that includes a plurality of wireless communication devices that mutually perform wireless communication using a set time band set in advance from among time bands included in a frame with a predetermined cycle. A first wireless communication device included in the wireless communication system that performs wireless communication with a second wireless communication device included in the wireless communication system, includes: a selector that, when the set time band is changed, selects a new time band for after the change from the time bands included in the frame; and a communication portion that transmits in a block information showing the new time band to the second wireless communication device as a set time band change request. When the second wireless communication device receives the set time band change request, if the new time band indicated by the set time band change request is available for use on the second wireless communication device, the second wireless communication device transmits a response, from a communication portion provided in the second wireless communication device, with regard to the set time band change request to the first wireless communication device. The first wireless communication device, based on the response received from the second wireless communication device, changes the setting of the set time band to the new time band.

According to another embodiment of the present invention, there is provided a wireless communication device that performs wireless communication with another wireless communication device using a set time band set in advance from among time bands included in a frame with a predetermined cycle. The wireless communication device includes: a selector that, when a set time band is changed, selects a new time band for after the change from the time bands included in the frame; a communication portion that transmits in a block information showing the new time band to the other wireless communication device, as a set time band change request; and a setting portion that, based on a response from the other wireless communication device with regard to the set time band change request, changes the set time band to the new time band.

In the present configuration, when the set time band is changed, the communication portion transmits in a block information showing the new time band to the other wireless communication device, as a set time band change request. Based on the response from the other wireless communication device with regard to the set time band change request, the setting portion changes the set time band to the new time band. The wireless communication device can therefore reduce the time required to change the set time band, as compared to when only the changed part of the set time band is transmitted to the other wireless communication device as a change request.

The communication portion receives available time band information from the other wireless communication device showing time bands available for use in the second wireless communication device. The selector, based on the available time band information, may select the new time band from among the available time bands on the second wireless communication device. This configuration reduces instances in which new time bands selected by a selection portion in the other wireless communication device cannot be used. If the new time band selected by the selection portion in the other wireless communication device cannot be used, further communication is necessary between the wireless communication device and the other wireless communication device. Therefore, with this wireless communication device, the time required to change the set time band can be shortened.

After the communication portion transmits the set time band change request, the setting portion, while changing the set time band, may set, as a temporary set time band, a time band that corresponds to the set time band before the change and to the new time band. With this configuration, after the communication portion transmits the set time band change request, even while the setting portion is changing the set time band, this wireless communication device can use time bands that correspond to the time band before the change and the new time band to continue communication with the other wireless communication device.

The communication portion receives usage information showing time bands set for use by other wireless communication devices in the vicinity, and, when there is a conflict between the time band shown by the usage information and the set time band on the wireless communication device, the selector may select a new time band such that the amount of time of the new time band corresponds to the amount of time of the set time band. With this configuration, even after the set time band has been set to the new time band, the communication speed preceding the set time change can be maintained.

A response instruction portion may be further provided that, when the communication portion receives the set time band change request, and when the new time band indicated by the set time band change request can be used by the wireless communication device, directs the communication portion to transmit a response with regard to the set time band change request to the other wireless communication device.

A communication demand determining portion that determines a communication demand required for the wireless communication device to transmit and receive data and a required amount determining portion that determines the necessary amount of time for the set time band to fulfill the communication demand may further be provided. When the amount of time of the set time band determined by the required amount determining portion is greater than the amount of time of the current set time band, the selector may add to the current set time band a time band for an amount of time that corresponds to the difference between the amount of time of the set time band determined by the required amount determining portion and the amount of time of the current set time band, and select the new time band.

According to another embodiment of the present invention, there is provided a program that includes instructions that command a computer to function as a first wireless communication device that uses a set time band set in advance from among time bands included in a frame with a predetermined cycle to perform wireless communication with a second wireless communication device. The first wireless communication device includes a selector that, when a set time band is changed, selects a new time band for after the change from the time bands included in the frame, a communication portion that transmits in a block information showing the new time band to the second wireless communication device as a set time band change request, and a setting portion that, based on a response from the second wireless communication device with regard to the set time band change request, changes the set time band to the new time band.

The program can, for example, cause a computer hardware resource that includes a CPU, ROM, RAM or the like to function as the above-described selector, communication portion and setting portion. In other words, the program can be used to cause the computer to function as the above-described wireless communication device.

According to another embodiment of the present invention, there is provided a wireless communication method for a first wireless communication device to perform wireless communication with a second wireless communication device using a set time band set in advance from among time bands included in a frame with a predetermined cycle. The wireless communication method includes the steps of: selecting, when a set time band is changed, a new time band for after the change from time bands included in a frame; transmitting in a block information showing the new time band to the second wireless communication device as a set time band change request; and changing the set time band to the new time band, based on a response from the second wireless communication device with regard to the set time band change request According to the embodiments of the present invention described above, the time required to change the set time band can be reduced.

BRIEF DESCRIPTION OF THE DRAWING(S)

FIG. 5 is an explanatory diagram showing an example structure of a slot reservation information element;

FIG. 6 is an explanatory diagram showing an example structure of reservation control information;

FIG. 7 is an explanatory diagram showing specific examples of reason codes;

DETAILED DESCRIPTION OF THE PREFERRED EMBODIMENT(S)

Figure 1:
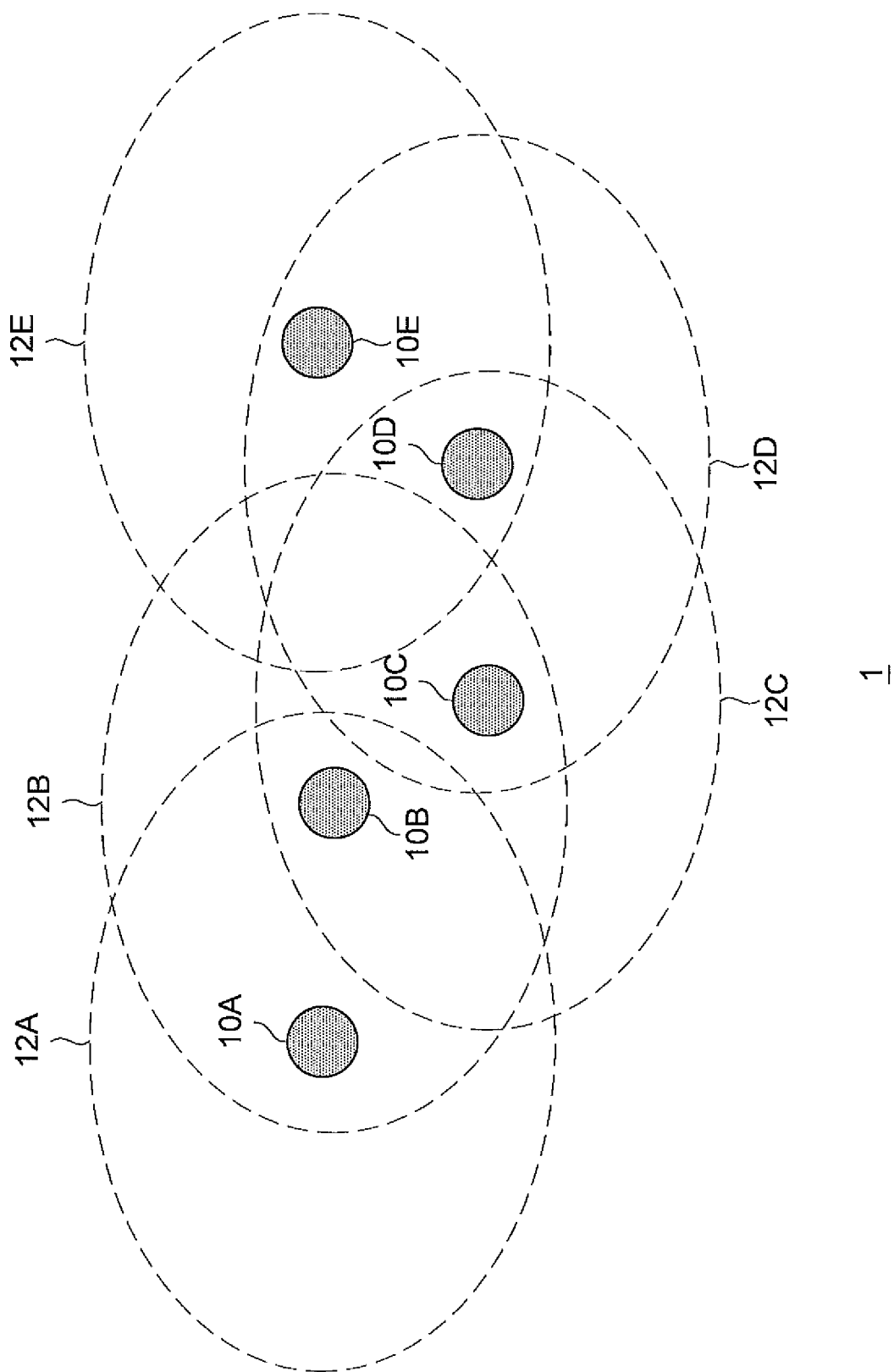
FIG. 1 is an explanatory diagram showing an example structure of an ad hoc wireless communication system.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The preferred embodiments to realize the present invention will be explained in the order shown below.

[1] Overview of a wireless communication system according to the present embodiment.
    [1-1] Structure of the wireless communication system
    [1-2] Time allocation control method
    [1-3] Data type format examples
    [1-4] Slot reservation methods
[2] Explanation of a wireless communication device according to the present embodiment
    [2-1] Structure of the wireless communication device
    [2-2] Operations of the wireless communication device
[3] Overview
[1] Overview of a Wireless Communication System According to the Present Embodiment.
[1-1] Structure of the Wireless Communication System FIG. 1 is an explanatory diagram showing an example structure of an ad hoc wireless communication system 1. As shown in FIG. 1, the wireless communication system 1 includes wireless communication devices 10A to 10E, and the regions marked with dotted lines show the ranges of radio wave reach (hereinafter referred to as the "wireless range") 12A to 12E in which each wireless communication device 10 can perform communication.

In the wireless communication system 1, the wireless communication device 10A can communicate with the wireless communication device 10B, which is included in the wireless range 12A. The wireless communication device 10B can communicate with the wireless communication device 10A and the wireless communication device 10C, which are included in the wireless range 12B. In the same way, the wireless communication device 10C can communicate with the wireless communication device 10B and the wireless communication device 10D. The wireless communication device 10D can communicate with the wireless communication device 10C and the wireless communication device 10E. The wireless communication device 10E can communicate with the wireless communication device 10D. In this way, the wireless communication devices 10A to 10E perform communications with the wireless communication devices included in the wireless ranges 12A to 12E, respectively, to form a wireless network that forms the wireless communication system 1.

In the present specification, where there is no particular need to distinguish between the wireless communication devices 10A to 10E, the specification will simply refer to the wireless communication device 10, and where there is no particular need to distinguish between the wireless ranges 12A to 12E, the specification will simply refer to the wireless range 12.

The wireless communication device 10 may be an information processing device, such as a personal computer (PC), a household image processing device (a DVD recorder, a video recorder or the like), a cellular telephone, a Personal Handyphone System (PHS), a portable sound playback apparatus, a portable image processing apparatus, a personal digital assistant (PDA), a household use game console, a portable game console, or an electrical household appliance.

[1-2] Time Allocation Control Method

Next, the time allocation control method for the wireless communication system 1 will be explained with reference to FIG. 2 and FIG. 3.

Figure 2:
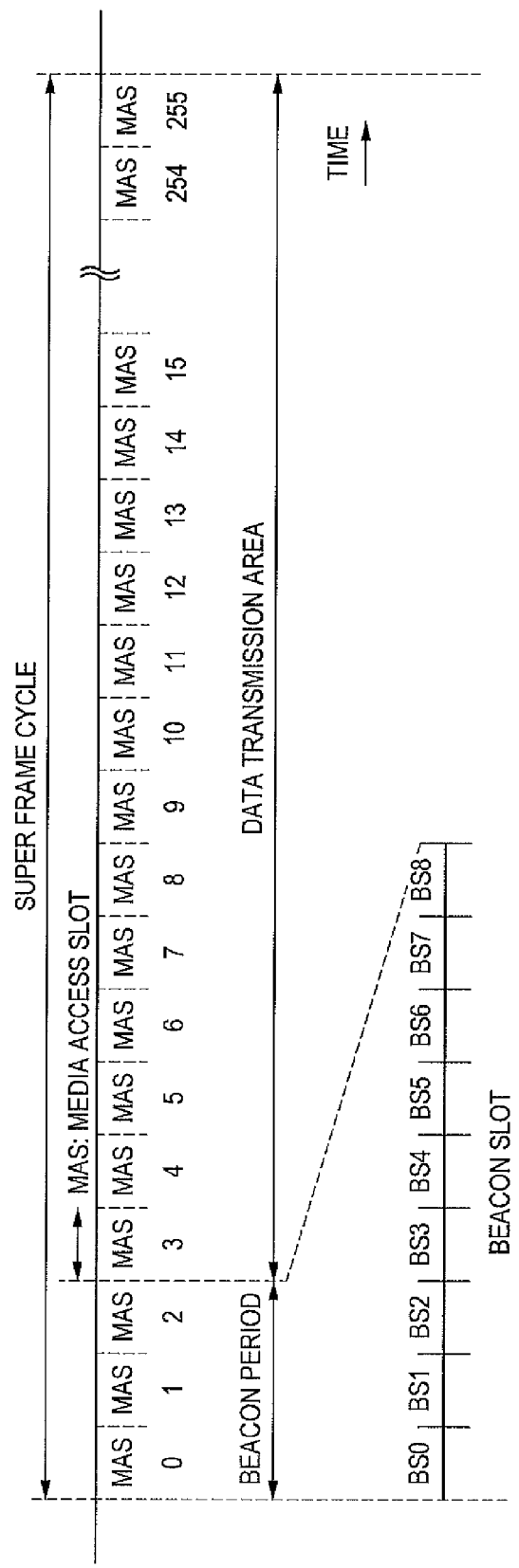
FIG. 2 is an explanatory diagram showing an example structure of a super frame.

FIG. 2 is an explanatory diagram showing an example structure of a super frame. A super frame cycle is defined by an established time period (for example 65 ms), and is divided into 256 media access slots (MAS). The wireless communication devices 10 forming the single wireless communication system 1 share the super frame cycle as a predetermined cycle frame, and transfer messages in units of the MAS (time bands).

Additionally, each super frame begins with a beacon period (BP) that acts as a management domain to transmit and receive management information by beacon (beacon signal), and beacon slots (BS) are allocated at predetermined intervals. A specific beacon slot is set for each wireless communication device 10, and parameters are exchanged between the peripheral wireless communication devices 10 to perform network management and access control. FIG. 2 shows an example of a beacon cycle with 9 beacon slots set from BS0 to BS8. The period not set as a beacon cycle is generally used as a data transmission area.

Figure 3:
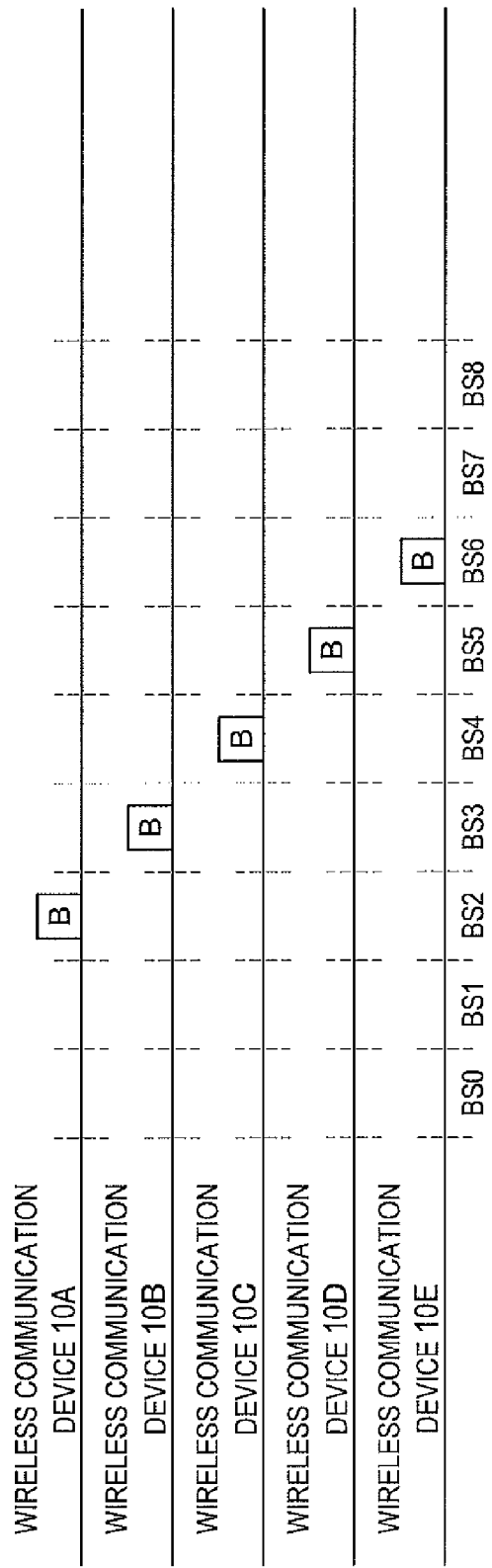
FIG. 3 is a conceptual diagram showing the beacon slot positions set by each wireless communication device on the respective wireless communication device.

FIG. 3 is a conceptual diagram showing beacon slot positions set by each wireless communication device 10 on the respective wireless communication device 10 when a single wireless communication system 1 is formed by wireless communication devices 10A to 10E. FIG. 3 shows that each wireless communication device 10 that forms part of a single wireless network selects its own beacon slot through mutual notification between the wireless communication devices 10 about which beacon slots are not being used.

For example, the wireless communication device 10A transmits its own beacons using the BS2 beacon slot, and the wireless communication device 10B transmits its own beacons using the BS3 beacon slot. In the same way, the wireless communication device 10C transmits its own beacons using the BS4 beacon slot, and the wireless communication device 10D transmits its own beacons using the BS5 beacon slot. The wireless communication device 10E transmits its own beacons using the BS6 beacon slot. FIG. 3 shows a state in which each wireless communication device 10 uses its own exclusive beacon slot to transmit beacons.

The slots BS0, BS1, BS7 and BS8 are secured to be used, as necessary, for a wireless communication device 10H or the like newly entering the wireless network. Generally, an established number of empty beacon slots are provided following the own beacon slot of the wireless communication device 10. The empty beacon slots are available in preparation for new entry by another wireless communication device 10. Also, the beacon period of each wireless communication device 10 is structured in a way that allows it to be expanded as appropriate, in accordance with the beacons of the peripheral wireless communication devices 10.

[1-3] Data Type Format Examples

Next, the structure of the format (frame) for types of data transmitted and received between each wireless communication device 10 will be explained with reference to FIG. 4 to FIG. 8.

Figure 4:
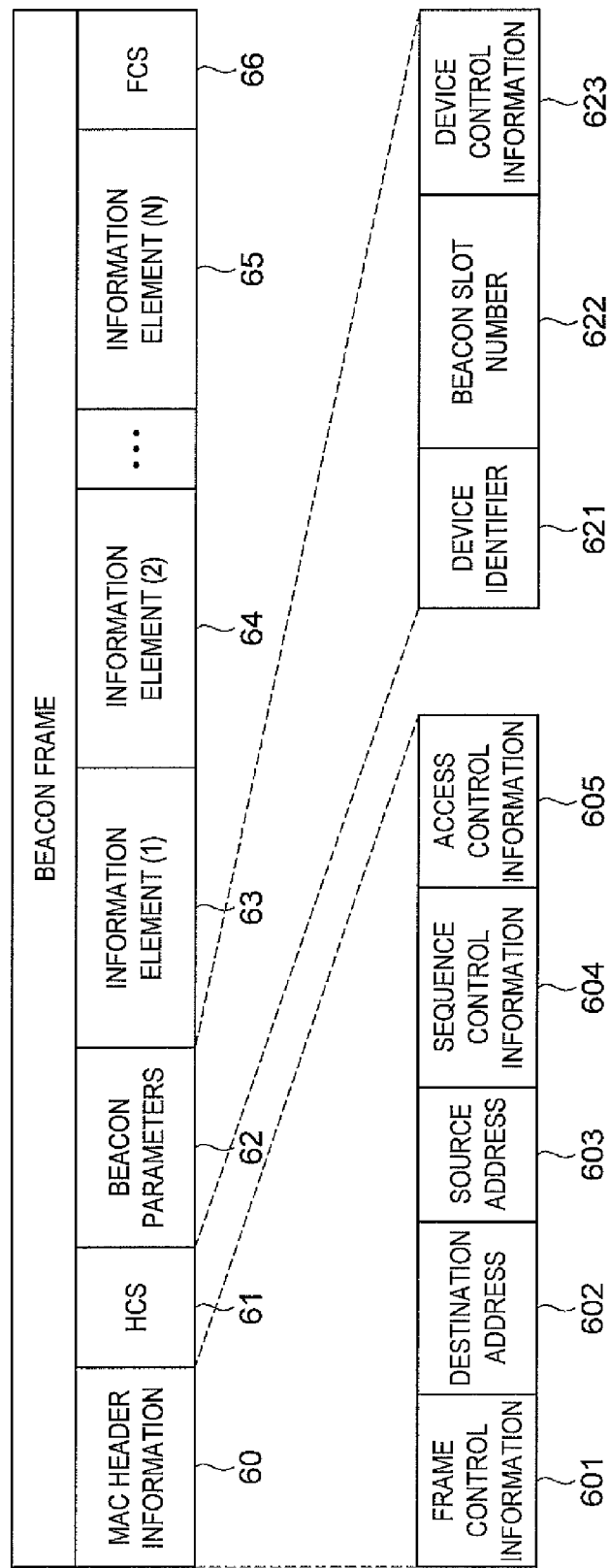
FIG. 4 is an explanatory diagram showing an example structure of a beacon frame.

FIG. 4 is an explanatory diagram showing an example structure of a beacon frame for a beacon transmitted from a beacon slot. As shown in FIG. 4, the beacon frame includes established management information, such as a MAC header information 60, a header check sequence (HCS) 61, beacon parameters 62, an information element (1) 63, an information element (2) 64, and information element (N) 65, and a frame check sequence (FCS) 66.

Further, the MAC header information 60 includes a frame control information 601, a destination address 602 that identifies the recipient wireless communication device, a source address 603 that identifies the transmitting wireless communication device, a sequence control information 604 including a sequence number and the like, and an access control information 605 that describes the necessary parameters for access control.

The beacon parameters 62 further include a device identifier 621 that describes the wireless communication device MAC address information and the like, a beacon slot number 622 that indicates the beacon slot used by the wireless communication device to transmit its own beacons, and a device control information 623 that includes information specific to the wireless communication device.

Information elements can be freely added to the beacon frame as beacon payload information. In FIG. 4 the information element (1) 63, the information element (2) 64 and the information element (N) 65 are shown as examples of information elements. The (N) described above indicates the number of information elements added to the beacon and transmitted, and the number of information elements (N) may differ with each beacon that is transmitted.

The frame check sequence (FCS) 66 is information used to detect errors in the beacon frame. The beacon frame may be structured such that each of the above parameters can be added or deleted as necessary.

FIG. 5 is an explanatory diagram showing an example structure of a slot reservation information element (distributed reservation protocol information element, or DRP IE). The slot reservation information element includes an element identifier 711, an information length 712, a reservation control information 713, a reservation destination device address 714, a reservation slot allocation (1) 715, and a reservation slot allocation (N) 716. The slot reservation information element shows the position of the slot reserved for use by the wireless communication device 10, and functions as usage information.

The element identifier 711 is information attached to each information element and is identification information that indicates what each information element is related to. Therefore, the element identifier 711 shown in FIG. 5 indicates the slot reservation information element. The information length 712 indicates the data size of the slot reservation information element.

The reservation control information 713 indicates slot reservation type, reservation status, status of the reservation processing and so on for the reservation made by the slot reservation information element. The reservation control information 713 will be explained later in more detail with reference to FIG. 6.

The reservation destination device address 714 is information that identifies the wireless communication device that is the target of the slot reservation by the slot reservation information element. Namely, the reservation destination device address 714 indicates the correspondent wireless communication device.

The reservation slot allocation (1) 715 to reservation slot allocation (N) 716 are information used to identify the position of the slots reserved or to be reserved by the wireless communication device 10.

FIG. 6 is an explanatory diagram showing an example structure for the above-described reservation control information 713. The reservation control information 713 includes a reservation type 801, a reservation number 802, a reason code 803, a reservation status 804, an owner identification 805, a conflict control 806, and a safety reservation 807.

The reservation type 801 is information indicating the type of slot reservation made by the slot reservation information element. The reservation number 802 is allocated a selected number. When a slot reservation is newly made, or a slot reservation is changed etc., the reason code 803 is a code indicating the reason for the new reservation or change. Specific examples of the reason code 803 will be explained later with reference to FIG. 7.

The reservation status information 804 is information indicating whether or not the slot reservation by the slot reservation information element is confirmed. For example, if the slot reservation made by the slot reservation information element is confirmed, the reservation status information 804 indicates '1' and if the slot reservation by the slot reservation information element is not confirmed, the reservation status information 804 indicates '0.'

The owner identification 805 indicates whether or not the wireless communication device 10 is the owner of the slot reservation made by the slot reservation information element, and the conflict control 806 is information used to determine the relative merits of both slot reservations when a slot reservation conflict occurs. The safety reservation 807 indicates the reservations up to a predetermined number of MAS.

FIG. 7 is an explanatory diagram showing specific examples of the reason code 803 described above. The reason code 803 expresses a code from 0 to 7.

The code 0 indicates "Approval" and is the code specified when a reservation request or a reservation change request are approved. The code 1 indicates "Conflict" and is the code specified when there is a conflict between a reservation request and an existing slot reservation. The code 2 indicates "Hold" and is the code specified when the reservation status is temporarily held. The code 3 indicates "Invalid" and is the code specified when a reservation request or a reservation change request are refused. The code 4 indicates "Correction" and is the code specified when slot reservations are reduced or concatenated.

The code 5 indicates "Additional" and is the code specified when a new slot reservation is made in addition to an existing slot reservation. The code 6 indicates "Change" and is the code specified when, although the same number of slot reservations as the existing number of slot reservations are maintained, some of the slot positions are changed. The code 7 indicates "Reservation" and is the code made available for future expansion.

Figure 8:
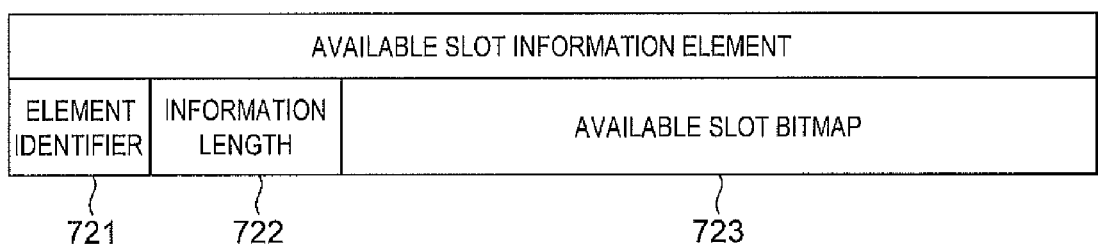
FIG. 8 is an explanatory diagram showing an example structure of an available slot information element.

FIG. 8 is an explanatory diagram showing an example structure of an available slot information element (DRP Availability IE). This is shown as an example of an information element included in a beacon. The available slot information element functions as information that shows useable time bands. The wireless communication device 10 indicates its own slots available for reservation in bitmap format, and if a slot reservation conflict or the like occurs, it uses the available slot information element to notify a correspondent device of the slots that are available for use.

The available slot information element includes an element identifier 721, an information length 722 and an available slot bitmap 723.

The element identifier 721 is information attached to each information element and is identification information that indicates what each information element is related to. Therefore, the element identifier 721 shown in FIG. 8 indicates the available slot information element. The information length 722 indicates the data size of the available slot information element.

The available slot bitmap 723 is information in a bitmap format used by the wireless communication device 10 to indicate its own available slots that have not been reserved for use by peripheral devices.

[1-4] Slot Reservation Methods

Next, slots that have been reserved by the wireless communication device 10 and that have been allocated to each wireless communication device 10 will be explained with reference to FIG. 9 to FIG. 12.

Figure 9:
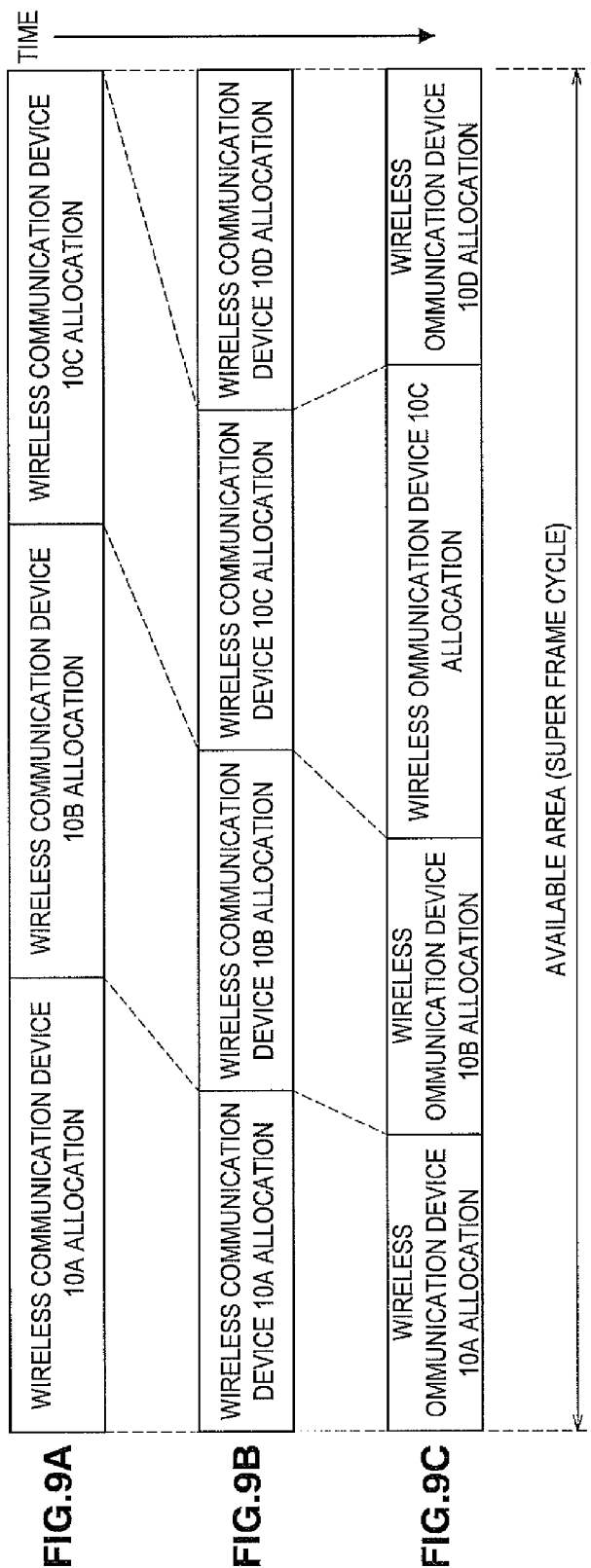
FIG. 9 is an explanatory diagram showing an example of a slot reservation method.

FIG. 9 is an explanatory diagram showing an example of a slot reservation method. The slot reservation method described here divides all the slots on the super frame between the number of wireless communication devices 10 that are on stream, and directs each wireless communication device 10 to use the allocated slot(s) exclusively.

Specifically, as shown in FIG. 9A, given the presence of the wireless communication devices 10A, 10B and 10C, all the super frame slots (all bandwidths) are divided equally by three, and the wireless communication devices 10A, 10B and 10C use the allocated slots.

Then, as shown in FIG. 9B, if the wireless communication device 10D is newly added, all the super frame slots are divided equally by four and the wireless communication devices 10A, 10B, 10C and 10D use the allocated slots. With this slot reservation method, as the number of wireless communication devices 10 increases, the number of slots allocated to a single wireless communication device 10 decreases.

If, for example, the wireless communication device 10C requests a greater number of slots (bandwidths), some of the unneeded bandwidths allocated to the wireless communication devices 10A, 10B and 10D can be made available to the wireless communication device 10C, as shown in FIG. 9C.

In this way, using the slot reservation method explained here, all the super frame slots are allocated to one of the wireless communication devices 10. As a result, slot use conflicts occur in overlapping areas of a plurality of networks.

Figure 10:
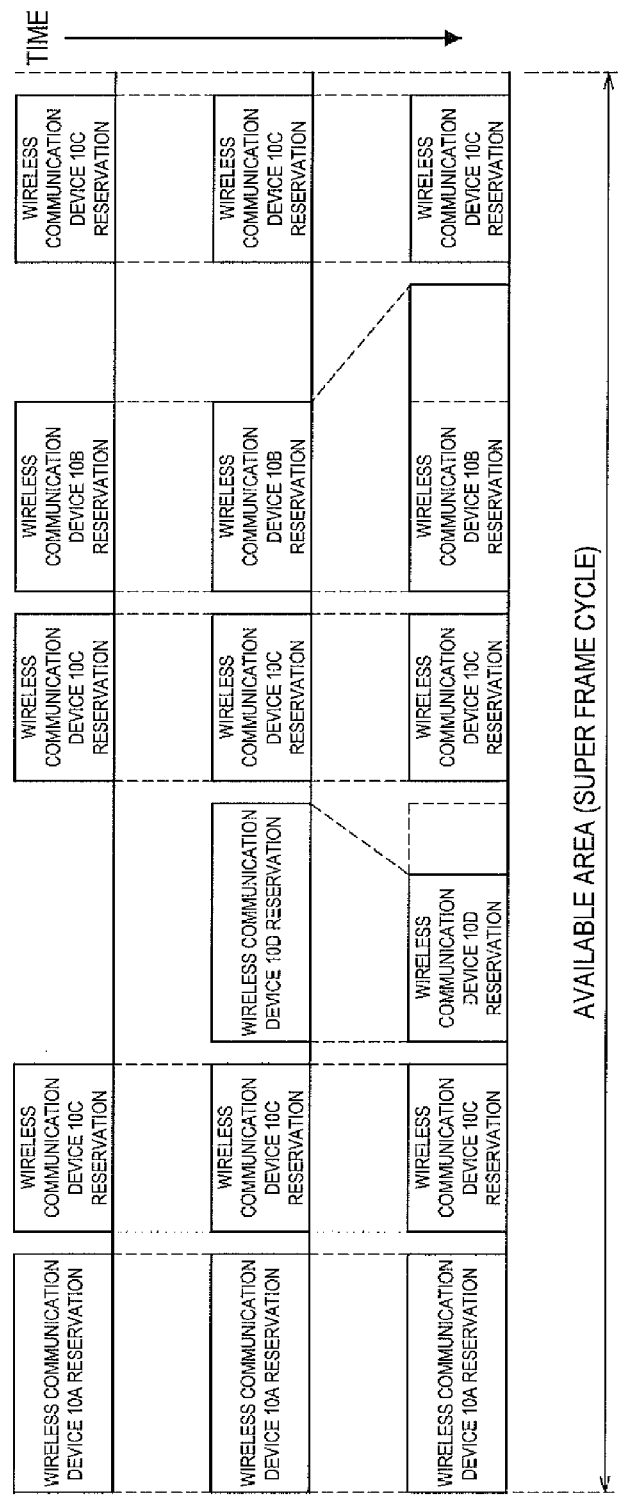
FIG. 10 is an explanatory diagram showing another example of a slot reservation method.

FIG. 10 is an explanatory diagram showing another example of a slot reservation method. In the slot reservation method described here, each wireless communication device 10 reserves the necessary bandwidths.

Specifically, as shown in FIG. 10A, given the presence of the three wireless communication devices 10A, 10B and 10C in the wireless communication system, each wireless communication device 10 reserves the necessary bandwidths. As a result, of all the bandwidths in the super frame, some free space areas are not reserved. Also, as shown here, the wireless communication device 10C can secure exactly the necessary number of slots freely in any position, and can efficiently communicate data for applications requiring short latencies.

Then, as shown in FIG. 10B, if the wireless communication device 10D is newly added, the wireless communication device 10D reserves slots from the free space. In other words, the wireless communication device 10D can reserve slots without any impact on the slot reservations of the wireless communication devices 10A, 10B and 10C.

Also, as the communication demand for each wireless communication device 10 increases or decreases, each wireless communication device 10 can increase or decrease the reserved bandwidths. For example, as shown in FIG. 10C, the wireless communication device 10B can add slot reservations and the wireless communication device 10D can reduce slot reservations without any change to the slot reservations of the wireless communication device 10A and of the wireless communication device 10C.

One feature of the wireless communication device 10 according to the present embodiment is the use of the above specific processing method to change slot reservations as described. This feature will be explained in more detail with reference to FIG. 16 to FIG. 18. When slot reservation conflicts occur between a plurality of the wireless communication devices 10, slot reservations have to be changed. Slot reservation conflicts and their resolution will now be explained with reference to FIG. 11 and FIG. 12.

Figure 11:
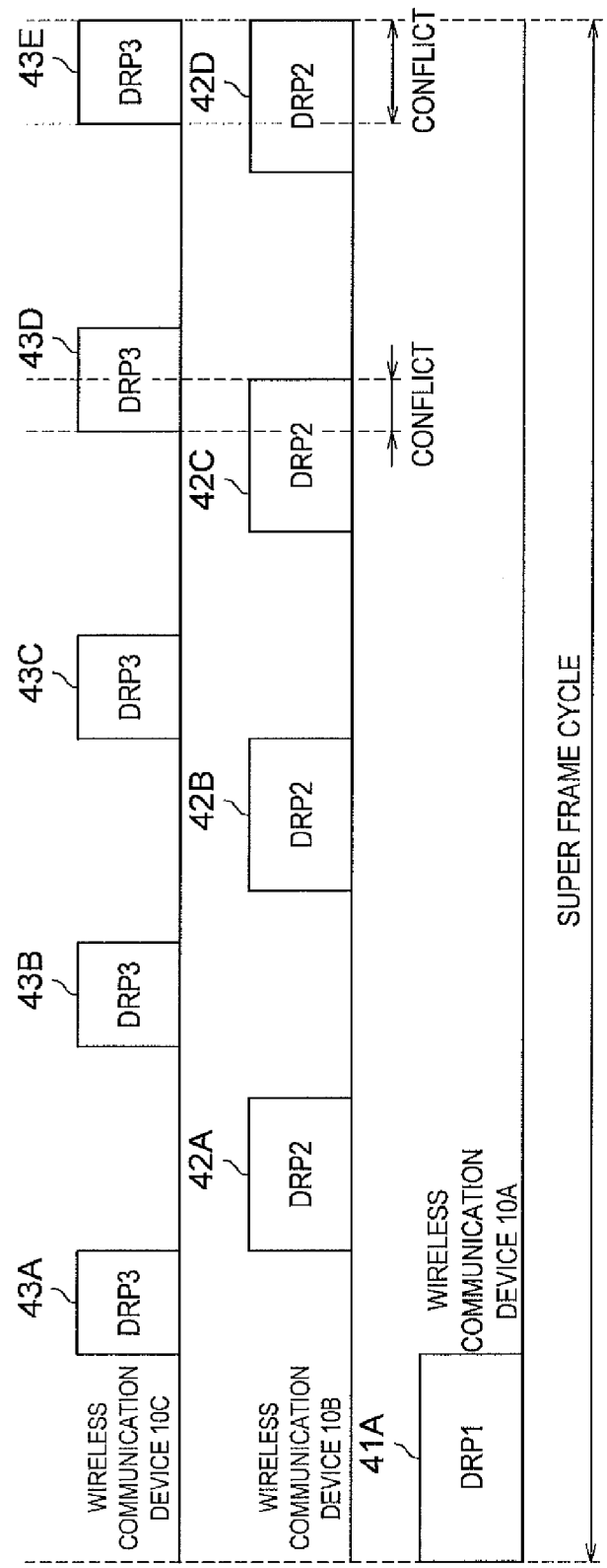
FIG. 11 is an explanatory diagram showing a situation when a slot reservation conflict occurs.

FIG. 11 is an explanatory diagram showing a slot reservation conflict. In detail, the wireless communication device 10A has set the DRP41A slot from the super frame cycle, and the wireless communication device 10B has set the four DRP42A to 42D slots from the super frame cycle. The wireless communication device 10C, which is operating in a separate network from the wireless communication device 10A and the wireless communication device 10B, has set the five DRP43A to 43E slots from the super frame cycle.

Here, the wireless communication device 10B can ascertain the slot reservation by the wireless communication device 10C based on the slot reservation information element (see FIG. 5) included in the beacon transmitted from the wireless communication device 10C. Therefore, when the wireless communication device 10B receives the beacon transmitted by the wireless communication device 10C, the wireless communication device 10B can ascertain whether there is a conflict between the DRP42C and 42D slots set on the wireless communication device 10B and the DRP43D and 43E slots set on the wireless communication device 10C.

Figure 12:
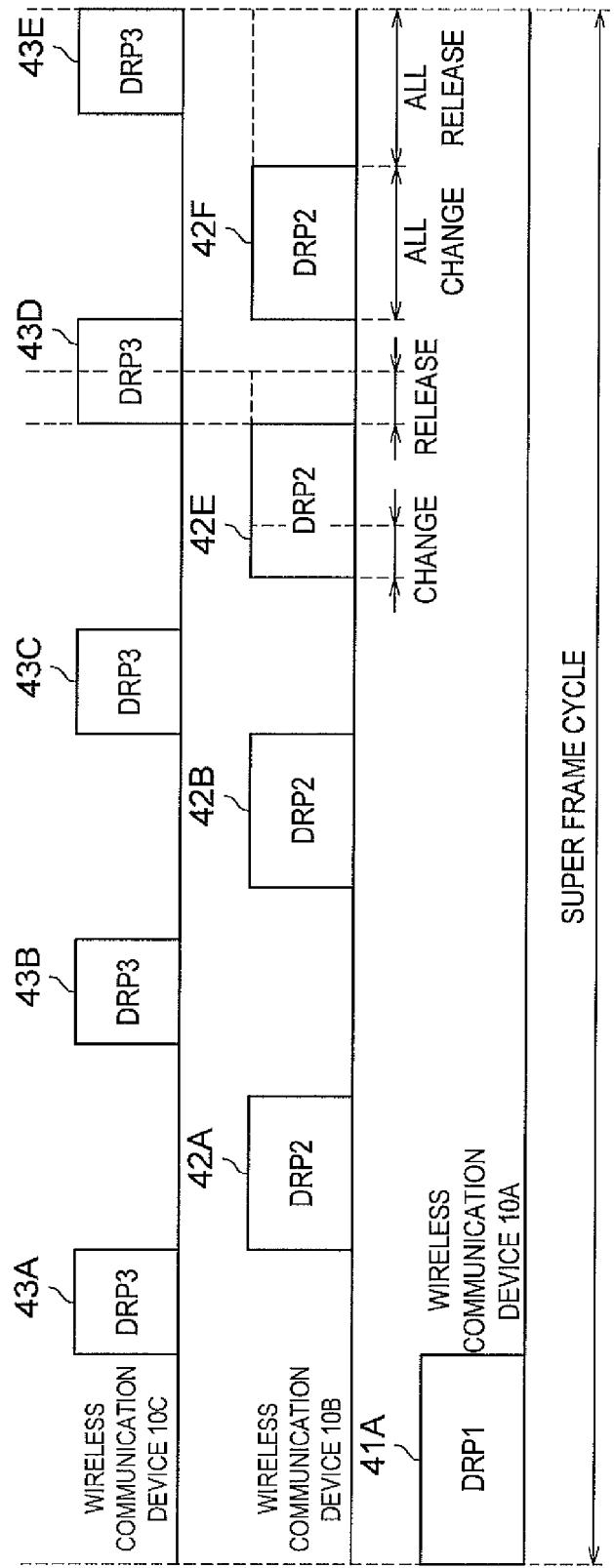
FIG. 12 is an explanatory diagram showing a situation when a slot reservation conflict is resolved.

FIG. 12 is an explanatory diagram showing a slot conflict resolution. When the wireless communication device 10B ascertains that there is a slot reservation conflict with the wireless communication device 10C, the wireless communication device 10B releases some of the conflicting DRP42C slots, and reserves a number of additional slots corresponding to the number of slots released. Also, the wireless communication device 10B releases all of the conflicting DRP42D slots, and newly reserves slots corresponding in number to the DRP42D slots.

In this way, if the wireless communication device 10B detects a conflict, it autonomously changes the slot reservations without any need to change the slot reservations of the wireless communication device 10C, and can continue communications. In other words, if the slot reservations of the wireless communication device 10B are changed at the point in time at which the wireless communication device 10C detects the presence of the wireless communication device 10B, no slot conflicts are detected.

Even if both the wireless communication device 10B and the wireless communication device 10C detect the slot reservation conflict at the same time, either wireless communication device 10 may change the slot reservation based on the conflict control bit included in the beacons.

Next, the methods of slot reservation and slot reservation changes by a wireless communication device 14 relating to the present invention will be explained with reference to FIG. 13 to FIG. 15.

Figure 13:
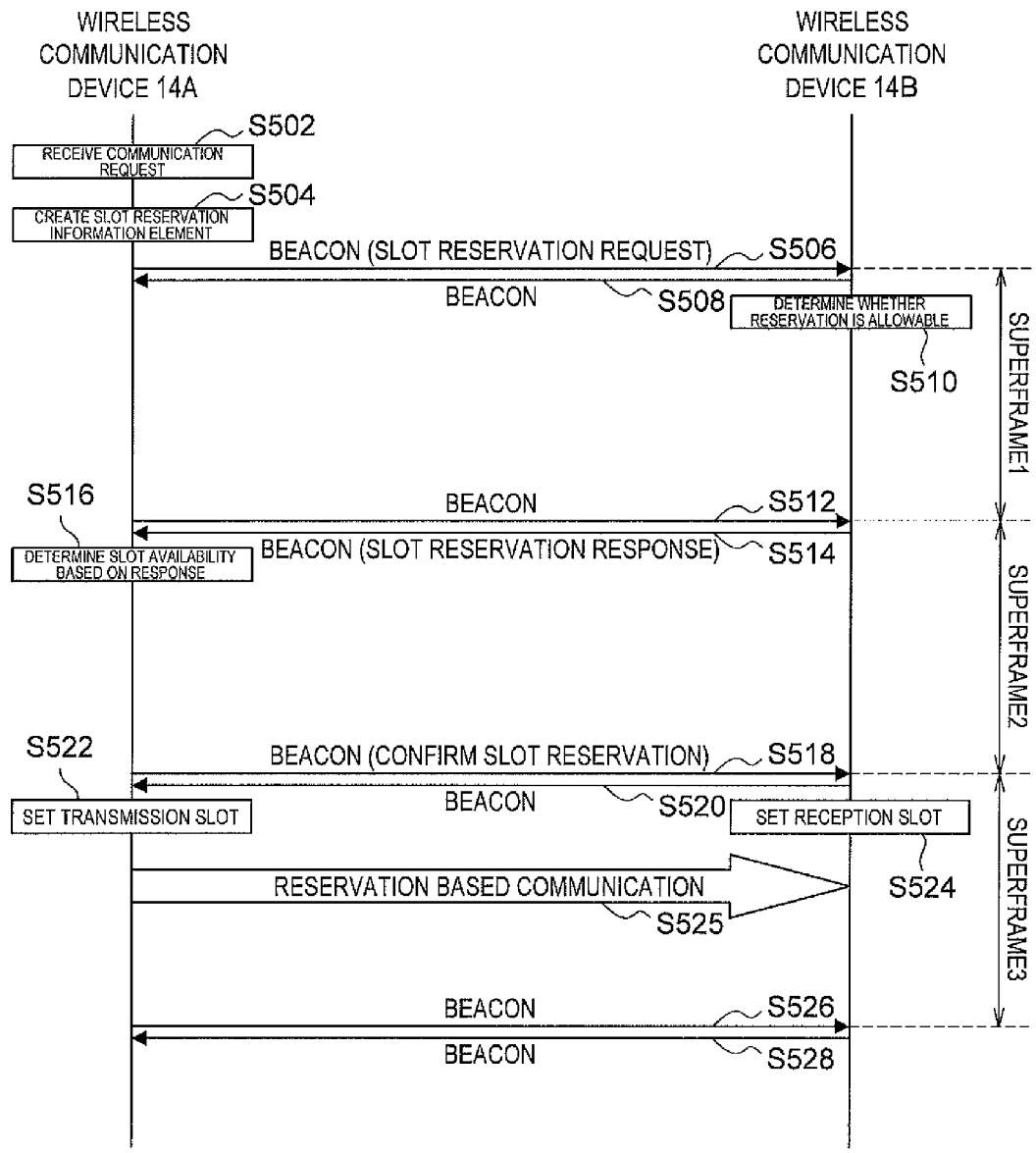
FIG. 13 is an explanatory diagram showing a process flow for slot reservation by wireless communication devices.

FIG. 13 is an explanatory diagram showing a process flow for slot reservation by the wireless communication devices 14. When the transmitting wireless communication device 14A receives a request for communication (step S502), the wireless communication device 14A creates a slot reservation information element (step S504). Then, the wireless communication device 14A transmits a beacon including the slot reservation information element to the recipient wireless communication device 14B (step S506). The wireless communication device 14B transmits a beacon to the wireless communication device 14A (step S508).

Next, when the beacon period ends, the wireless communication device 14B determines whether or not a slot reservation request has been received from the wireless communication device 14A (step S510).

The wireless communication device 14A then transmits a beacon to the wireless communication device 14B (step S512) and the wireless communication device 14B transmits a beacon to the wireless communication device 14A (the slot reservation response) (step S514), the beacon including the determination made in step S510 with regard to the slot reservation request. Here, a single super frame cycle is required between the previous beacon period (step S506 to step S508) and the current beacon period (step S512 to step S514).

Next, when the beacon period ends, based on the slot reservation response received from the wireless communication device 14B, the wireless communication device 14A determines whether or not the wireless communication device 14B has any available slots that can be used (step S516).

Next, the wireless communication device 14A transmits a beacon to the wireless communication device 14B (step S518), the beacon including information to confirm the slot reservation for the slot determined in step S516. The wireless communication device 14B transmits a beacon to the wireless communication device 14A (step S520). Here, a single super frame cycle is required between the previous beacon period (step S512 to step S514) and the current beacon period (step S518 to step S520). Then, the wireless communication device 14A sets the confirmed slot as the transmission slot (step S522), and the wireless communication device 14B sets the reception slot based on the information included in the beacon received (step S524).

After that, the wireless communication devices 14A and 14B can perform reservation based communication using the slots set in each of the wireless communication devices 14A and 14B. From this point on, beacons continue to be transmitted and received between the wireless communication devices 14A and 14B, and reservation based communication is performed using the set slots (step S525).

In this way, the wireless communication devices 14 cannot perform reservation based communication until the time has passed for approximately two to three super frame cycles following reception of a communication request.

Figure 14:
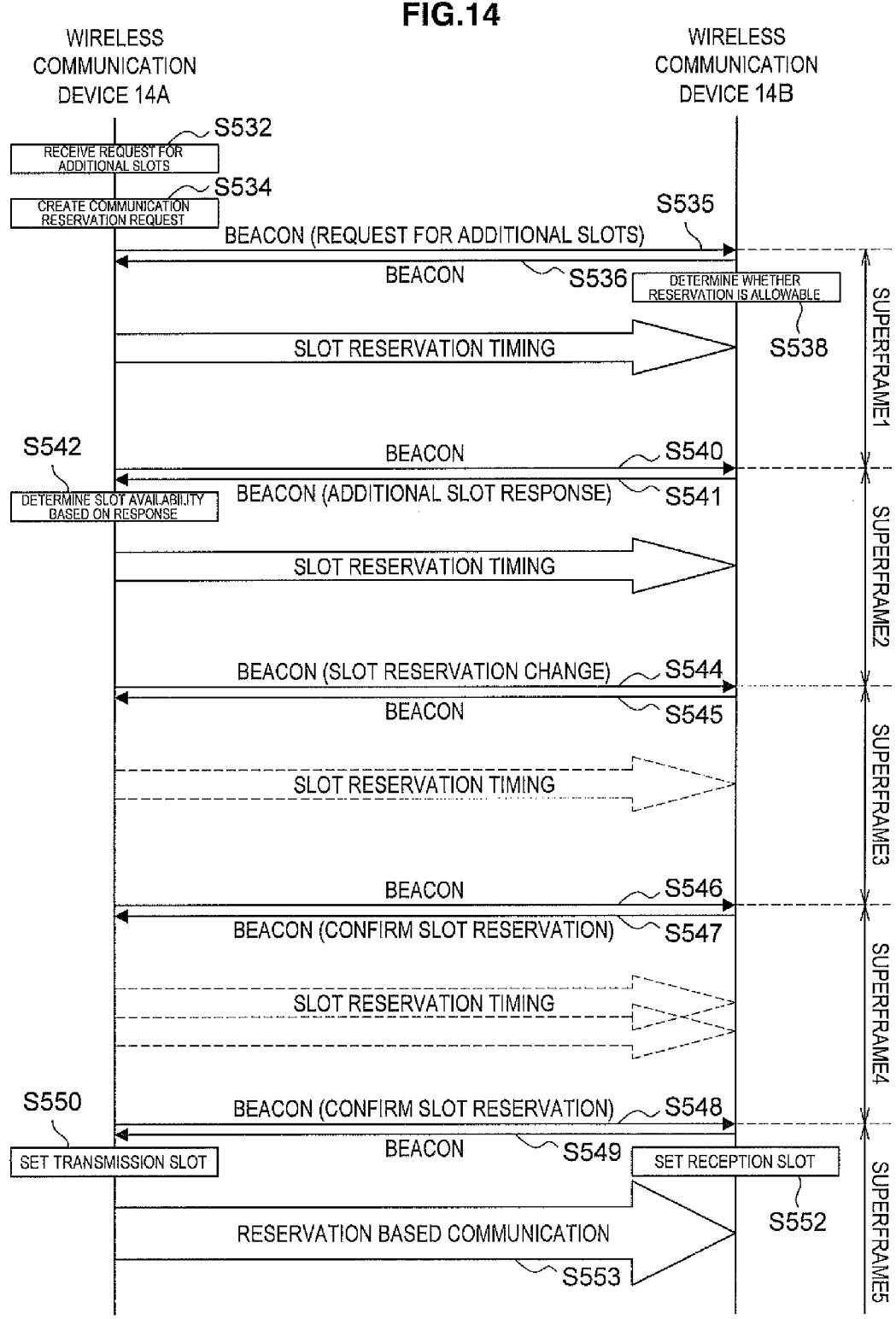
FIG. 14 is an explanatory diagram showing a process flow for additional slot reservation by wireless communication devices.

FIG. 14 is an explanatory diagram showing a process flow for additional slot reservation by the wireless communication devices 14. When the transmitting wireless communication device 14A receives a request for additional slots (step S532), the wireless communication device 14A creates a slot reservation information element for the newly added slots (step S534). Then, the wireless communication device 14A transmits a beacon including the slot reservation information element to the recipient wireless communication device 14B (step S535). The wireless communication device 14B transmits a beacon to the wireless communication device 14A (step S536).

Next, when the beacon period ends, the wireless communication device 14B determines whether or not a slot reservation request has been received from the wireless communication device 14A (step S538).

The wireless communication device 14A then transmits a beacon to the wireless communication device 14B (step S540) and the wireless communication device 14B transmits a beacon to the wireless communication device 14A (the additional slot response) (step S541), the beacon including the determination made in step S538 with regard to the request for additional slot reservations. Here, a single super frame cycle is required between the previous beacon period (step S535 and step S536) and the current beacon period (step S540 and step S541).

Next, when the beacon period ends, based on the additional slot reservation response received from the wireless communication device 14B, the wireless communication device 14A determines whether or not the wireless communication device 14B has any available slots that can be used (step S542).

Next, the wireless communication device 14A transmits a beacon to the wireless communication device 14B (step S544), the beacon including coalesced information combining information about the slots determined in step S542, and the previously reserved slots (the slot reservation change). Here, a single super frame cycle is required between the previous beacon period (step S540 and step S541) and the current beacon period (step S544 and step S545).

In the next super frame cycle, the wireless communication device 14A transmits a beacon to the wireless communication device 14B (step S546), and the wireless communication device 14B transmits a beacon to the wireless communication device 14A indicating the slot reservation response (step S547). Here, a single super frame cycle is required between the previous beacon period (step S544 and step S545) and the current beacon period (step S546 and step S547).

After that, the wireless communication device 14A transmits a beacon to the wireless communication device 14B (step S548), the beacon including information indicating confirmation of the slot reservation for available slots in the wireless communication device 14B as determined based on the slot reservation response received from the wireless communication device 14B. The wireless communication device 14B transmits a beacon to the wireless communication device 14A (step S549). Here, a single super frame cycle is required between the previous beacon period (step S546 and step S547) and the current beacon period (step S548 and step S549). Then, the wireless communication device 14A sets the confirmed slot as the transmission slot (step S550), and the wireless communication device 14B sets the reception slot based on information included in the beacon (step S552). From this point on, reservation based communication is performed using the previously used and additional slots (step S553).

In this way, the wireless communication devices 14 cannot perform reservation based communication until the time has passed for approximately four to five super frame cycles following reception by the wireless communication device 14A of a request for additional slots. Also, as indicated by the dotted lines in FIG. 14, the slots (including the previously used slots) are not confirmed during the super frame cycles 3 and 4, and communications may therefore be interrupted.

Figure 15:
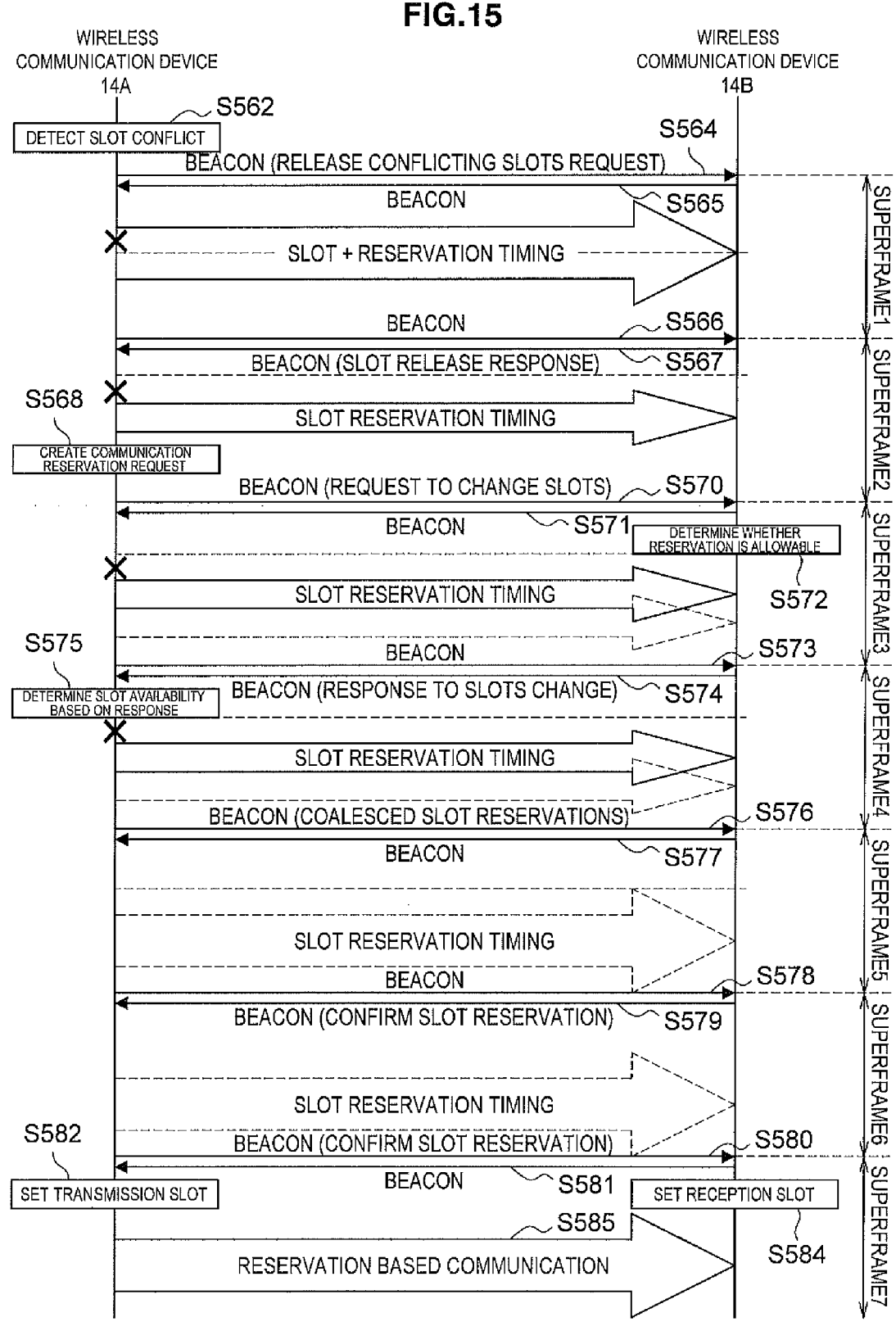
FIG. 15 is an explanatory diagram showing a process flow for changing a slot reservation by wireless communication devices.

FIG. 15 is an explanatory diagram showing a process flow for changing a slot reservation by the wireless communication devices 14. When the transmitting wireless communication device 14A detects a slot reservation conflict (step S562), the wireless communication device 14A uses a beacon to transmit a request to the wireless communication device 14B to release the part of the slot reservation that is in conflict (step S564). The wireless communication device 14B transmits a beacon to the wireless communication device 14A (step S565). Also, the wireless communication device 14A stops using the slots in the conflicting part of the slot reservation.

The wireless communication device 14A then transmits a beacon to the wireless communication device 14B (step S566) and the wireless communication device 14B transmits a beacon to the wireless communication device 14A including the response to the request to release conflicting slots (step S567). Here, a single super frame cycle is required between the previous beacon period (step S564 and step S565) and the current beacon period (step S566 and step S567). The wireless communication device 14A then creates a reservation request to change the slot reservation for a number of slots corresponding to the number of conflicting slots (step S568).

After that, the wireless communication device 14A transmits a beacon to the wireless communication device 14B (step S570), the beacon including a slot reservation request for the changed slots (slot request for changed slots). The wireless communication device 14B transmits a beacon to the wireless communication device 14A (step S571). Here, a single super frame cycle is required between the previous beacon period (step S566 and step S567) and the current beacon period (step S570 and step S571). Next, the wireless communication device 14B determines whether or not to accept the request to change slots (step S572).

Next, the wireless communication device 14A transmits a beacon to the wireless communication device 14B (step S573), and the wireless communication device 14B transmits a beacon to the wireless communication device 14A (the response to changed slots) (step S574), the beacon including the determination made in step S572 with regard to the slot request for changed slots. Here, a single super frame cycle is required between the previous beacon period (step S570 and step S571) and the current beacon period (step S573 and step S574).

Next, when the beacon period ends, based on the response to the changed slots received from the wireless communication device 14B, the wireless communication device 14A determines whether or not the wireless communication device 14B has any available slots that can be used (step S575).

Next, the wireless communication device 14A transmits a beacon to the wireless communication device 14B (step S576), the beacon including coalesced information combining information about the slots determined in step S575, and the previously reserved slots (coalesced slot reservation). The wireless communication device 14B transmits a beacon to the wireless communication device 14A (step S577). Here, a single super frame cycle is required between the previous beacon period (step S573 and step S574) and the current beacon period (step S576 and step S577).

In the next super frame cycle, the wireless communication device 14A transmits a beacon to the wireless communication device 14B (step S578), and the wireless communication device 14B transmits a beacon to the wireless communication device 14A indicating the slot reservation response (step S579). Here, a single super frame cycle is required between the previous beacon period (step S576 and step S577) and the current beacon period (step S578 and step S579).

After that, the wireless communication device 14A transmits a beacon to the wireless communication device 14B (step S580), the beacon including information indicating confirmation of the slot reservation for available slots in the wireless communication device 14B as determined based on the slot reservation response received from the wireless communication device 14B. The wireless communication device 14B transmits a beacon to the wireless communication device 14A (step S581). Here, a single super frame cycle is required between the previous beacon period (step S578 and step S579) and the current beacon period (step S580 and step S581). Then, the wireless communication device 14A sets the confirmed slot as the transmission slot (step S582), and the wireless communication device 14B sets the reception slot based on information included in the beacon (step S584). From this point on, reservation based communication is performed using the slots after the slot change (step S585).

In this way, the wireless communication devices 14 cannot perform reservation based communication using the slots after the slot change until the time has passed for approximately six to seven super frame cycles following detection of a slot conflict. Also, as indicated by the dotted lines in FIG. 15, the slots (including the previously used slots) are not confirmed during the super frame cycles 5 and 6, and communications may therefore be interrupted.

[2] Explanation of the Wireless Communication Device According to the Present Embodiment As explained above, the reservation of additional slots and the changing of slot reservations (in a broad sense, both can be considered to be slot reservation changes) by the wireless communication device 14 relating to the present invention require a significant length of time.

To address this, a wireless communication device 10 according to the present embodiment has been created. The wireless communication device 10 according to the present embodiment can reduce the time required for slot reservation changes. The structure and the operations of the wireless communication device 10 will be explained in detail below with reference to FIG. 16 to FIG. 19.

[2-1] Structure of the Wireless Communication Device 10

Figure 16:
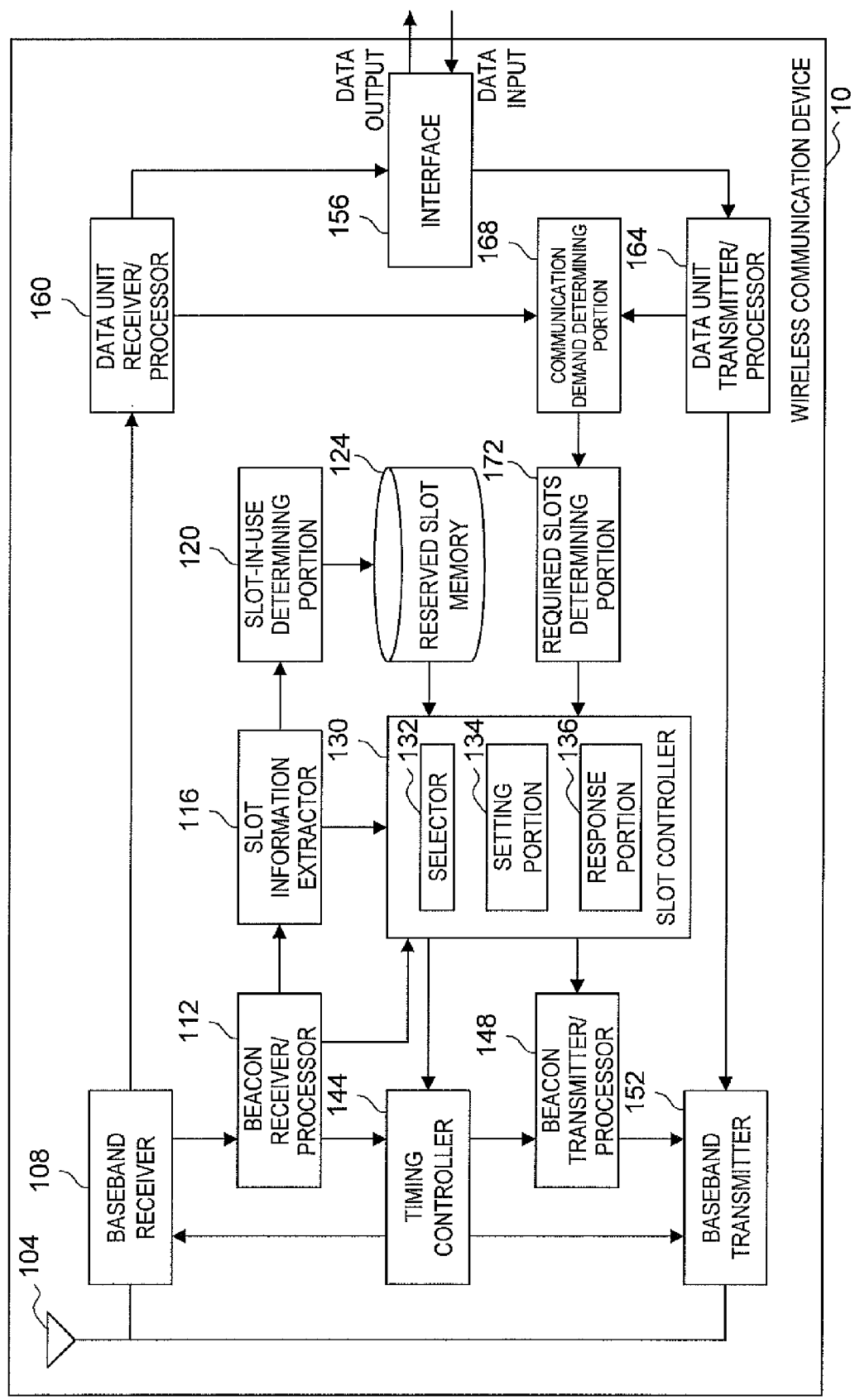
FIG. 16 is a functional block diagram showing the structure of a wireless communication device according to the present embodiment.

FIG. 16 is a functional block diagram showing the structure of the wireless communication device 10 according to the present embodiment. The wireless communication device 10 includes an antenna 104, a baseband receiver 108, a beacon receiver/processor 112, a slot information extractor 116, a slot-in-use determining portion 120 that determines slots which are being used, a reserved slot memory 124, a slot controller 130, a timing controller 144, a beacon transmitter/processor 148, a baseband transmitter 152, an interface 156, a data unit receiver/processor 160, a data unit transmitter/processor 164, a communication demand determining portion 168, and a required slots determining portion 172 that determines how many slots are needed.

The antenna 104 functions as a receiver that receives wireless signals transmitted by peripheral wireless communication devices 10 and a transmitter that transmits its own wireless signals. In other words, the antenna 104 functions as a communication portion. The baseband receiver 108 decodes the wireless signals received from the peripheral wireless communication devices 10 via the antenna 104.

The beacon receiver/processor 112 extracts information from beacon frames included in the signals decoded by the baseband receiver 108. The slot information extractor 116 extracts information relating to slot reservations included in the beacon. For example, the slot extractor 116 extracts the slot reservation information element and the available slot information element from the beacon.

Based on information relating to slot reservations included in the beacon, the slot-in-use determining portion 120 determines which slots are being used by the peripheral wireless communication devices 10, and the reserved slot memory 124 stores the slots determined by the slot-in-use determining portion 120 as currently being used by the peripheral wireless communication devices 10.

The reserved slot memory 124 may also store slots available for use by each wireless communication device 10, based on the available slot information element.

The reserved slot memory 124 may be, for example, a non-volatile memory such as an electronically erasable programmable read-only memory (EEPROM), an erasable programmable read-only memory (EPROM), or the like, a magnetic disk such as a hard disk, a flexible disk, or the like, an optical disk such as a compact disc recordable (CD-R), a compact disc rewritable (CD-RW), a digital versatile disc recordable (DVD-R), a digital versatile disc rewritable (DVD-RW), a dual-layer digital versatile disc recordable (DVD+R), a dual-layer digital versatile disc rewritable (DVD+RW), a digital versatile disc random access memory (DVD-RAM), a Blu-Ray™ disc recordable (BD-R), a dual-layer Blu-Ray™ disc recordable (BD-RE), or the like, or a magneto-optical (MO) disk.

The slot controller 130 includes a selector 132, a setting portion 134 and a response portion 136, and the slot controller 130 performs processing necessary to make new slot reservations and to change slot reservations.

When it becomes necessary to make changes to the slot reservation due to slot conflicts or increased communication demand, the selector 132 selects the new slots for use after the reservation changes from the slots included in the super frame. At that time, the selector 132 may select the new slots for use after the reservation changes from among the available slots of correspondent wireless communication devices stored in the reserved slot memory 124. The new slots selected by the selector 132 are transmitted in a block from the antenna 104 to the correspondent wireless communication devices as a change request. For example, the new slots selected by the selector 132 may be included in a single beacon.

Also, if there is a conflict between the slot reservations of the peripheral wireless communication devices and the wireless communication device 10, the selector 132 may select new slots corresponding in number to the number of slots previously reserved.

If a response is received from the correspondent wireless communication device approving the request for changes to the slot reservation, the setting portion 134 changes the slot reservation to the new slot or slots.

If there is a change request from the correspondent wireless communication device 10, the response portion 136 determines whether to accept or refuse the request for the change, and functions as a portion to issue response instructions corresponding to the results of its determination. For example, if there are new slots available in its own wireless communication device 10 as indicated by the change request, the response portion 136 instructs a response accepting the change request to be transmitted from the antenna 104.

The timing controller 144 performs transmission and reception control using the slot start time for the slots used to transmit and receive beacons and data by the wireless communication device 10.

The beacon transmitter/processor 148 generates transmission beacons. For example, the beacon transmitter/processor 148 can generate beacons including slot reservation information elements indicating the new slots selected by the selector 132, or can generate beacons including information indicating the response to change requests from correspondent wireless communication devices. The baseband transmitter 152 performs processing to modulate the signals (beacons for example) transmitted to the peripheral wireless communication devices 10 to wireless signals.

The data unit receiver/processor 160 converts the signals decoded by the baseband receiver 108 into a format compatible to devices connected via the interface 156. The data unit transmitter/processor 164 constructs wireless signal data from the signals input from devices connected via the interface 156.

Based on the status of input signals to the data unit receiver/processor 160 or the status of data construction by the data unit transmitter/processor 164, the communication demand determining portion 168 determines the presence or lack of communication demand for the wireless communication device 10. Based on the determination made by the communication demand determining portion 168, the required slots determining portion 172 functions as a determining portion that determines the number of slots necessary for the wireless communication device 10 to perform communications. If the number of slots determined by the required slots determining portion 172 is more than the number of slots currently reserved, in addition to the currently reserved slots, the selector 132 can select as additional slots exactly the number of slots to make up the difference between the number of slots determined necessary by the required slots determining portion 172 and the number of slots currently reserved.

[2-2] Operations of the Wireless Communication Device 10

Next, actual examples of additions and changes to slot reservations by the wireless communication device 10 will be explained.

Figure 17:
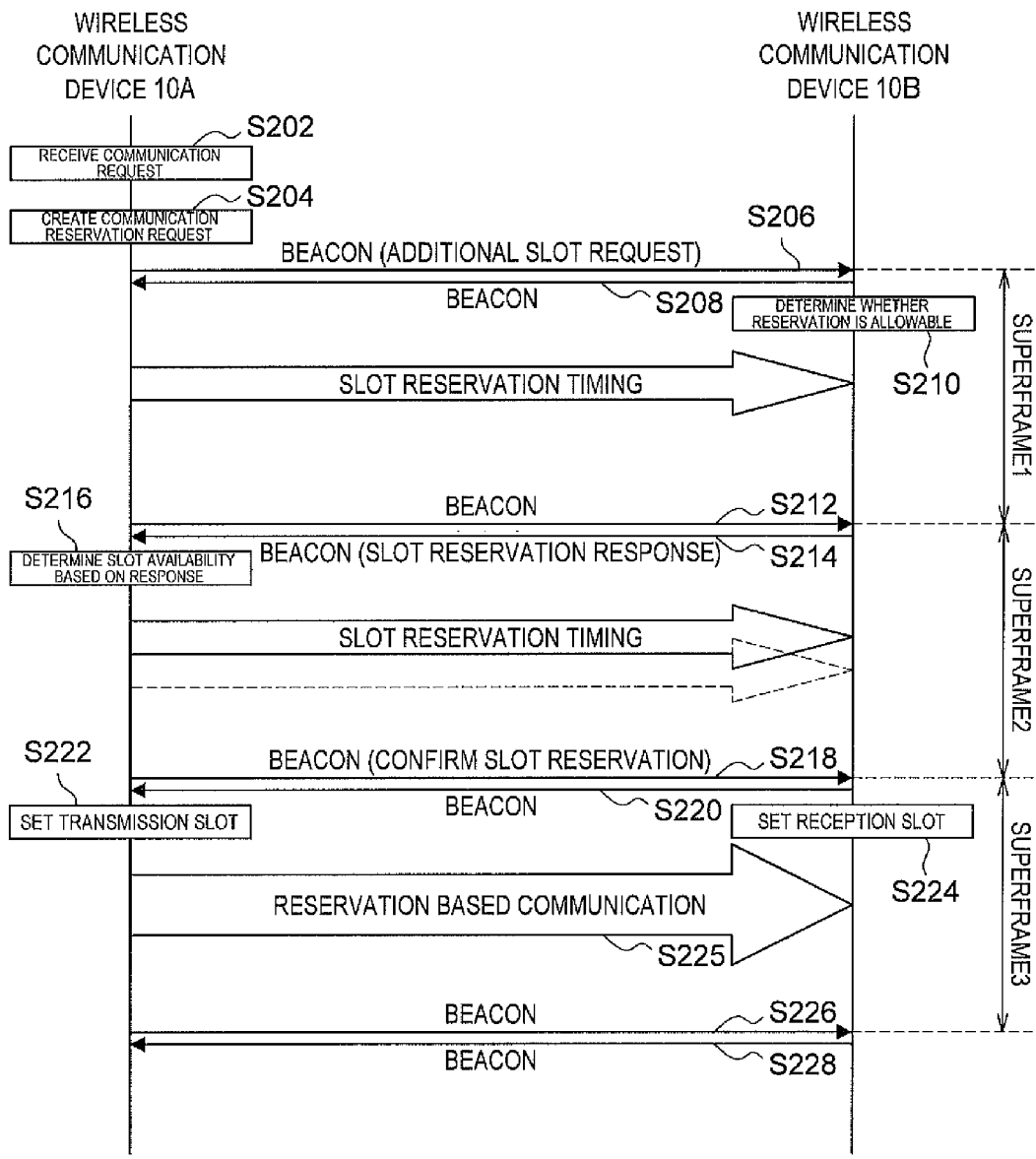
FIG. 17 is an explanatory diagram showing a process flow for additional slot reservation by the wireless communication device according to the same embodiment.

FIG. 17 is an explanatory diagram showing a process flow for additional slot reservation by the wireless communication device 10 according to the present embodiment. The transmitting wireless communication device 10A and the recipient wireless communication device 10B are performing reservation based communication using set slots (set time bands) reserved in advance.

In this situation, when the selector 132 of the wireless communication device 10A receives an additional slot reservation request (step S202), the beacon transmitter/processor 148 creates a beacon (step S204). The beacon includes the address of the wireless communication device 10B as the reservation destination device address 714, and also includes all of the new slots selected by the selector 132 from the reservation slot allocation (1) 715 to the reservation slot allocation (N) 716 (the previously reserved slots+the additional slots). The beacon transmitter/processor 148 may mark up the code 5, indicating "additional," as the reason code 803 for the beacon, and "1" for the reservation status 804, indicating "confirmed." The selector 132 may also refer to the reservation slot memory 124 and select new slots from the slots available on the wireless communication device 10B.

Then, the wireless communication device 10A transmits the beacon created by the beacon transmitter/processor 148 to the wireless communication device 10B as an additional slot request (step S206). The wireless communication device 10B transmits a beacon to the wireless communication device 10A (step S208).

Next, when the beacon period ends, the wireless communication device 10B determines whether or not to accept the additional slot request from the wireless communication device 10A (step S210).

Next, the wireless communication device 10A transmits a beacon to the wireless communication device 10B (step S212), and the wireless communication device 10B transmits a beacon to the wireless communication device 10A (step S214), the beacon including the determination made in step S210 with regard to the additional slot request (the slot reservation response). Here, it is assumed that the wireless communication device 10B transmits a slot reservation response to the wireless communication device 10A indicating acceptance of the additional slot reservation request. A single super frame cycle is required between the previous beacon period (step S206 and step S208) and the current beacon period (step S212 and step S214).

When the beacon period ends, based on the slot reservation response received from the wireless communication device 10B, the setting portion 134 of the wireless communication device 10A determines whether or not the wireless communication device 10B has any available slots that can be used (step S216).

Next, the wireless communication device 10A transmits a beacon to the wireless communication device 10B (step S218), the beacon including information confirming the slot reservations for the slots determined in step S216. In other words, the reservation status 804 in the beacon is "1," indicating "confirmed." The wireless communication device 10B transmits a beacon to the wireless communication device 10A (step S220). Here, a single super frame cycle is required between the previous beacon period (step S212 and step S214) and the current beacon period (step S218 and step S220). Then, the setting portion 134 of the wireless communication device 10A sets the confirmed slot as the transmission slot (step S222) and the wireless communication device 10B sets the reception slot based on the information included in the received beacon (step S224).

After that, the wireless communication devices 10A and 10B can perform reservation based communication using the slots set on each of the wireless communication devices 10A and 10B. From this point on, beacons continue to be transmitted and received between the wireless communication devices 10A and 10B (step S226 and step S228), and reservation based communication is performed using the set slots (step S225).

In this way, after the time taken for approximately two to three super frame cycles from the reception of the additional slot reservation request, the wireless communication device 10 according to the present embodiment can perform reservation based communication using the slots following additional reservation. Also, for example, by indicating a "confirmed" reservation status for the previous slot reservations included in the beacons transmitted and received between the wireless communication devices 10A and 10B, additional slot reservations can be performed while continuing communications.

Figure 18:
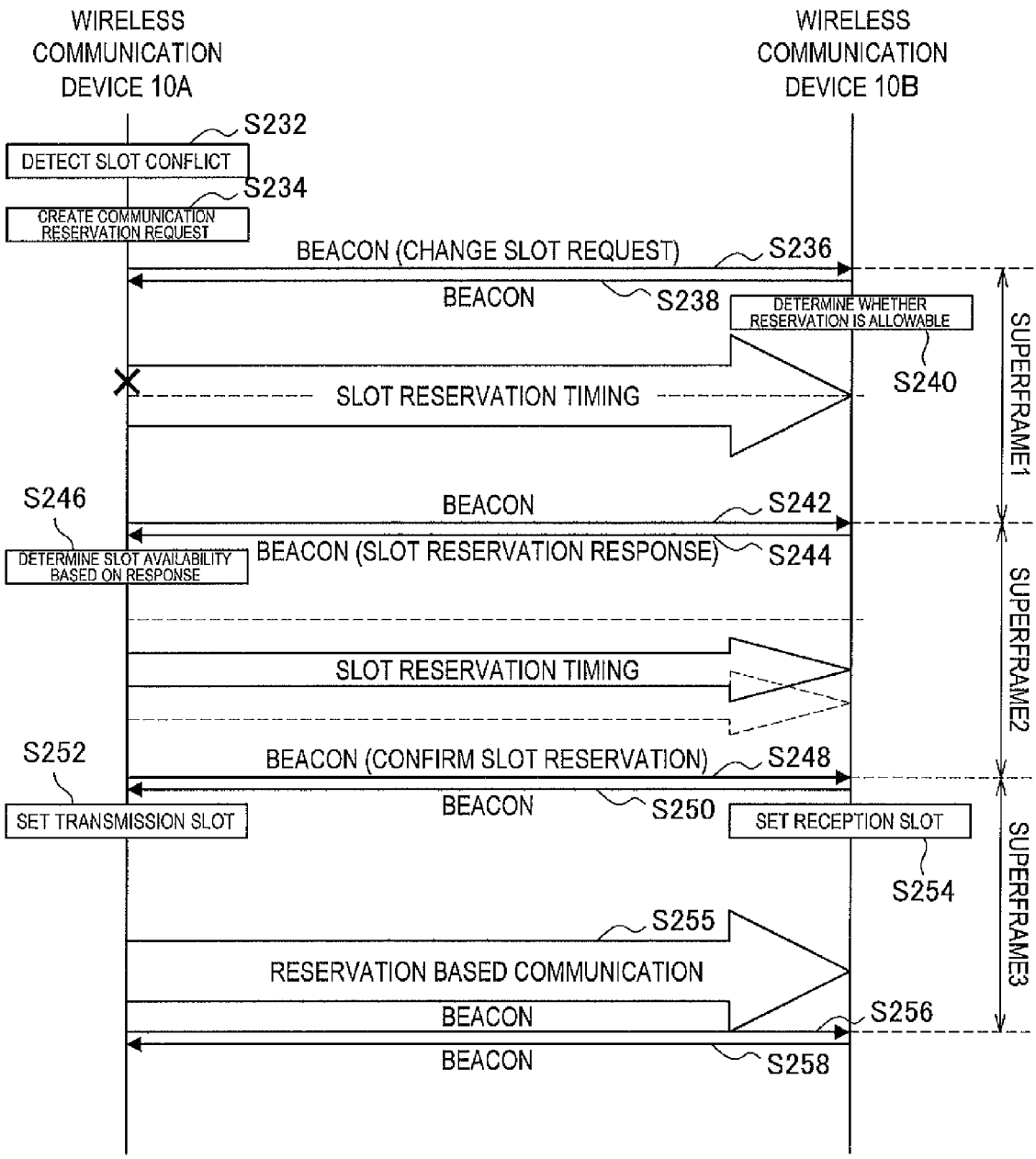
FIG. 18 is an explanatory diagram showing a process flow for changing a slot reservation by the wireless communication device according to the same embodiment.

FIG. 18 is an explanatory diagram showing a process flow for changing a slot reservation by the wireless communication device 10 according to the present embodiment. The transmitting wireless communication device 10A and the recipient wireless communication device 10B are performing reservation based communication using set slots reserved in advance.

In this situation, when the wireless communication device 10A detects a slot reservation conflict (step S232), the beacon transmitter/processor 148 creates a beacon (step S234). The beacon includes the address of the wireless communication device 10B as the reservation destination device address 714, and also includes all of the new slots selected by the selector 132 from the reservation slot allocation (1) 715 to the reservation slot allocation (N) 716. The beacon transmitter/processor 148 may mark up the code 6, indicating "change," as the reason code 803 for the beacon, and "1" for the reservation status 804, indicating "confirmed." The selector 132 may also refer to the reservation slot memory 124 and select new slots from the slots available on the wireless communication device 10B. Slot reservation conflicts are detected, for example, based on the slot reservation information elements (usage information) included in beacons received from peripheral wireless devices.

Then, the wireless communication device 10A transmits the beacon created by the beacon transmitter/processor 148 to the wireless communication device 10B as a change slot request (step S236). The wireless communication device 10B transmits a beacon to the wireless communication device 10A (step S238).

Next, when the beacon period ends, the wireless communication device 10B determines whether or not to accept the change slot request from the wireless communication device 10A (step S240).

Next, the wireless communication device 10A transmits a beacon to the wireless communication device 10B (step S242), and the wireless communication device 10B transmits a beacon to the wireless communication device 10A (step S244), the beacon including the determination made in step S230 with regard to the change slot request (the slot reservation response). Here, a single super frame cycle is required between the previous beacon period (step S236 and step S238) and the current beacon period (step S242 and step S244).

When the beacon period ends, based on the slot reservation response received from the wireless communication device 10B, the setting portion 134 of the wireless communication device 10A determines whether or not the wireless communication device 10B has any available slots that can be used (step S246).

Next, the wireless communication device 10A transmits a beacon to the wireless communication device 10B (step S248), the beacon including information confirming the slot reservations for the slots determined in step S246. In other words, the reservation status 804 in the beacon is "1," indicating "confirmed." The wireless communication device 10B transmits a beacon to the wireless communication device 10A (step S250). Here, a single super frame cycle is required between the previous beacon period (step S242 and step S244) and the current beacon period (step S248 and step S250). Then, the setting portion 134 of the wireless communication device 10A sets the confirmed slot as the transmission slot (step S252) and the wireless communication device 10B sets the reception slot based on the information included in the received beacon (step S254).

After that, the wireless communication devices 10A and 10B can perform reservation based communication using the slots set on each of the wireless communication devices 10A and 10B. From this point on, beacons continue to be transmitted and received between the wireless communication devices 10A and 10B (step S256 and step S258), and reservation based communication is performed using the set slots (step S255).

In this way, after the time taken for approximately two to three super frame cycles from the detection of the slot reservation conflict, the wireless communication device 10 according to the present embodiment can perform reservation based communication using the slots following the reservation change. Also, for example, by indicating a "confirmed" reservation status for the slot reservations that included in the beacons transmitted and received between the wireless communication devices 10A and 10B, additional slot reservations can be performed while continuing communications.

Figure 19:
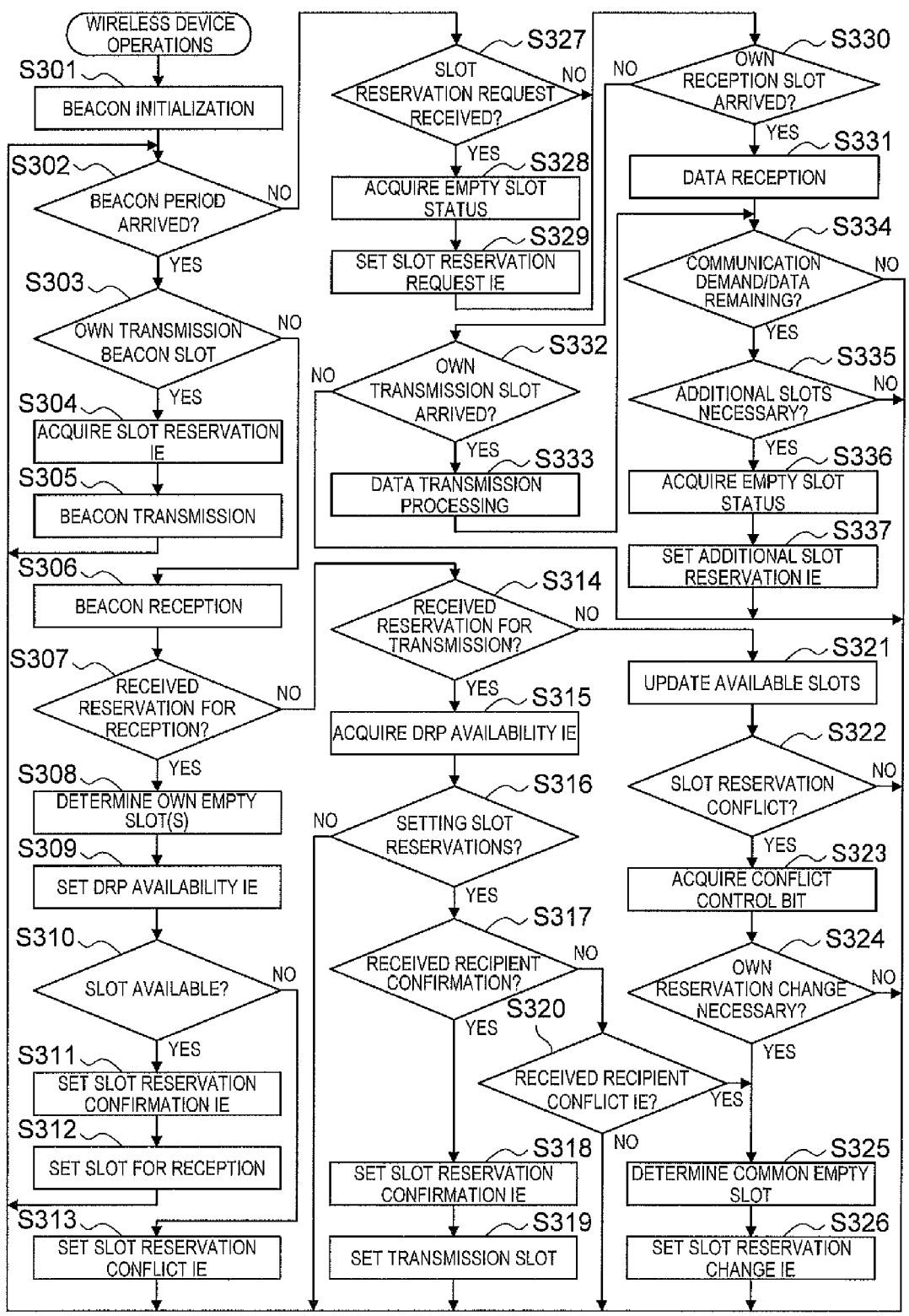
FIG. 19 is a flow chart showing a flow of operations of the wireless communication device according to the same embodiment.

FIG. 19 is a flow chart showing a flow of operations of the wireless communication device 10 according to the present embodiment. First, immediately after switching on the power source, the wireless communication device 10 performs initialization (step S301). In initialization, the wireless communication device 10 performs a scan, and sets its own beacon period and beacon transmission slot. The wireless communication device 10 is then in the beacon period (step S302) set in step S301, and when its own transmission beacon slot arrives (step S303), the wireless communication device 10 acquires a set information element (IE) relating to slot reservations (step S304) and performs beacon transmission (step S305).

On the other hand, among the beacon periods, if there is a beacon period other than its own transmission slot, the wireless communication device 10 performs beacon reception (step S306). Then, if the wireless communication device 10 receives a reservation for which the wireless communication device 10 is the recipient (step S307), it refers to the reservation information in previously received beacons, acquires information about its own empty slots (step S308) and sets an available slot IE (DRP Availability IE) (step S309).

Next, if the requested slot is available (step S310), the wireless communication device 10 sets a slot reservation confirmation IE (step S311) and sets the relevant slot as the reception slot (step S312). If, however, the requested slot is not available, the wireless communication device 10 sets a slot reservation conflict IE (step S313).

If the wireless communication device 10 receives a reservation for which the wireless communication device 10 is the transmission source (step S314), it acquires an available slot IE (DRP Availability IE) (step S315). Then, if the wireless communication device 10 is in the process of slot reservation initialization, in the process of adding slots or in the process of changing slots (step S316) and if a reservation confirmation IE is transmitted from the recipient (step S317), the wireless communication device 10 sets a slot reservation confirmation IE (step S318). The wireless communication device 10 then sets the slot as the transmission slot (step S319).

When a reservation conflict IE is transmitted from the recipient (step S320), the wireless communication device 10 transfers to step S325 and changes slot reservations. On the other hand, if the wireless communication device 10 receives a reservation IE from the recipient other than a reservation conflict IE, the wireless communication device 10 returns to step S302 and repeats the series of processes.

Also, if a beacon received by the wireless communication device 10 includes reservation information between other wireless communication devices, the wireless communication device 10 updates the available slots based on that information (step S321). After that, if the above-mentioned reservation information conflicts with the slots the wireless communication device 10 has reserved and set (step S322), the wireless communication device 10 further acquires a conflict control bit (step S323). Next, the wireless communication device 10 determines whether it needs to change its own reservations, and if a change is necessary (step S324), it determines a common empty slot between the wireless communication device 10 and the recipient (step S325) and sets a slot reservation change IE for the slot (step S326). On the other hand, if there is no reservation slot conflict, and it is not necessary for the wireless communication device 10 to change its own reservations, the wireless communication device 10 returns to step S302 and repeats the series of processes.

If the wireless communication device 10 is outside its beacon period and receives a slot reservation request via the interface 156 (step S327), the wireless communication device 10 acquires the status of its own empty slots (step S328), and, from among the empty slots, creates a slot reservation request IE corresponding to the number of slots requested (step S329).

When its own reception slot has arrived (step S330), the wireless communication device 10 performs data reception (step S331) and also transfers to step S334. If there is any reception data remaining, the wireless communication device 10 performs additional slot processing (step S334).

If it is the wireless communication device 10 transmission slot (step S332), the wireless communication device 10 performs data transmission (step S333). Further, if there is transmission data remaining (step S334), the wireless communication device 10 determines whether or not additional slots are necessary (step S335). If the wireless communication device 10 determines that additional slots are necessary, it acquires the empty slot status (step S336), and sets an additional slot reservation IE until the necessary number of slots is reached (step S337). Also, if there is no transmission data or reception data remaining, and it is not necessary to request additional slots, the wireless communication device 10 transfers to step S302 and repeats the series of processes.

[3] Overview

As explained above, with the wireless communication device 10 according to the present embodiment, when changing the slot reservation, the change request is sent in a block indicating the new slots for after the change to the correspondent wireless communication device. Also, based on the response from the correspondent wireless communication device with regard to the change request, the setting portion 134 changes the slot reservation to the new slot. Therefore, with the wireless communication device 10, the time required to change the slot can be reduced, in comparison to instances where only the slot change part is transmitted as a change request to the correspondent wireless communication device. As a result, during the process of changing the slot reservation, slot conflicts with other reservations can also be prevented.

It should be understood by those skilled in the art that various modifications, combinations, sub-combinations and alterations may occur depending on design requirements and other factors insofar as they are within the scope of the appended claims or the equivalents thereof.

For example, each of the steps performed by the wireless communication device 10 in this specification need not necessarily be performed chronologically in the order shown in the flow charts or explanatory diagrams, but may include processing in parallel or as individual steps (for example, parallel processing or object processing).

A computer program may also be provided that directs hardware such as a CPU, ROM and RAM and the like built into the wireless communication device 10 to fulfill functions corresponding to each of the configurations of the wireless communication device 10 described above. A recording medium is also provided on which the computer program is recorded. Each of the function blocks shown in the functional block program in FIG. 16 can also be configured using hardware, and the series of processes performed by the hardware.

What is claimed is:

1. A wireless communication system that includes a plurality of wireless communication devices that mutually perform wireless communication using a set time band set in advance from among time bands included in a frame with a predetermined cycle, wherein a first wireless communication device included in the wireless communication system that performs wireless communication with a second wireless communication device included in the wireless communication system, comprises:

a selector that, when the set time band is changed, selects a new time band for after the change from the time bands included in the frame; and a communication portion that transmits in a block information showing the new time band to the second wireless communication device as a set time band change request; wherein when the second wireless communication device receives the set time band change request, if the new time band indicated by the set time band change request is available for use on the second wireless communication device, the second wireless communication device transmits a response, from a communication portion provided in the second wireless communication device, with regard to the set time band change request to the first wireless communication device; and the first wireless communication device, based on the response received from the second wireless communication device, changes the setting of the set time band to the new time band;

wherein a super frame cycle is required between the transmission of the set time band change request and the transmission of the set time band change response.

2. A wireless communication system according to claim 1, wherein the first wireless communication device cannot perform wireless communication with the second wireless communication device until a time has passed for approximately two to three super frame cycles following the set time band being changed.

3. A wireless communication system according to claim 2, wherein following a request for an additional set time band, the first wireless communication device cannot perform wireless communication with the second wireless communication device until a time has passed for approximately four to five super frame cycles.

4. A wireless communication device that performs wireless communication with another wireless communication device using a set time band set in advance from among time bands included in a frame with a predetermined cycle, the wireless communication device comprising:

a selector that, when a set time band is changed, selects a new time band for after the change from the time bands included in the frame;

a communication portion that transmits in a block information showing the new time band to the other wireless communication device, as a set time band change request; and a setting portion that, based on a response from the other wireless communication device with regard to the set time band change request, changes the set time band to the new time band;

wherein a super frame cycle is required between the transmission of the set time band change request and the response to the set time band change request.

5. The wireless communication device according to claim 4, wherein the communication portion receives available time band information from the other wireless communication device showing time bands available for use in the other wireless communication device, and the selector, based on the available time band information, selects the new time band from among the available time bands on the other wireless communication device.

6. The wireless communication device according to claim 4, wherein after the communication portion transmits the set time band change request, the setting portion, while changing the set time band, sets, as a temporary set time band, a time band that corresponds to the set time band before the change and the new time band.

7. The wireless communication device according to claim 4, wherein the communication portion receives usage information showing time bands set for use by other wireless communication devices in the vicinity, and when there is a conflict between the time band shown by the usage information and the set time band on the wireless communication device, the selector selects a new time band such that the amount of time of the new time band corresponds to the amount of time of the set time band.

8. A wireless communication system according to claim 7, wherein the wireless communication device cannot perform wireless communication with the other wireless communication device until a time has passed for approximately six to seven super frame cycles following detection of the slot conflict.

9. The wireless communication device according to claim 4, further comprising:

a response instruction portion that, when the communication portion receives the set time band change request, and when the new time band indicated by the set time band change request can be used by the wireless communication device, directs the communication portion to transmit a response with regard to the set time band change request to the other wireless communication device.

10. The wireless communication device according to claim 4, further comprising:

a communication demand determining portion that determines a communication demand required for the wireless communication device to transmit and receive data; and a required amount determining portion that determines the necessary amount of time for the set time band to fulfill the communication demand, wherein when the amount of time of the set time band determined by the required amount determining portion is greater than the amount of time of the current set time band, the selector adds to the current set time band a time band for an amount of time that corresponds to the difference between the amount of time of the set time band determined by the required amount determining portion and the amount of time of the current set time band, and selects the new time band.

11. A non-transitory computer-readable storage medium storing a computer program which, when executed by a first wireless communication device causes the first wireless communication device to perform wireless communication with a second wireless communication device using a set time band set in advance from among time bands included in a frame with a predetermined cycle, the wireless communication method comprising the steps of:

selecting, when a set time band is changed, a new time band for after the change from the time bands included in the frame;

transmitting in a block information showing the new time band to the second wireless communication device as a set time band change request; and changing the set time band to the new time band, based on a response from the second wireless communication device with regard to the set time band change request;

wherein a super frame cycle is required between the transmission of the set time band change request and the response to the set time band change request.

12. A wireless communication method for a first wireless communication device to perform wireless communication with a second wireless communication device using a set time band set in advance from among time bands included in a frame with a predetermined cycle, the wireless communication method comprising the steps of:

selecting, when a set time band is changed, a new time band for after the change from time bands included in a frame;

transmitting in a block information showing the new time band to the second wireless communication device as a set time band change request; and changing the set time band to the new time band, based on a response from the second wireless communication device with regard to the set time band change request;

wherein a super frame cycle is required between the transmission of the set time band change request and the response to the set time band change request.

* * * * *